(12) United States Patent
Caspall et al.

(10) Patent No.: US 12,169,259 B2
(45) Date of Patent: Dec. 17, 2024

(54) REFLECTIVE SURFACE BEAMFORMING

(71) Applicant: Navico, Inc., Tulsa, OK (US)

(72) Inventors: Jayme J. Caspall, Tulsa, OK (US); Bin Gao, Wilmington, NC (US); Andrew Chambers, Broken Arrow, OK (US); Dustyn P. Pendergraft, Claremore, OK (US); Oscar Villalvazo, Ensenada (MX)

(73) Assignee: Navico, Inc., Tulsa, OK (US)

( * ) Notice: Subject to any disclaimer, the term of this patent is extended or adjusted under 35 U.S.C. 154(b) by 252 days.

(21) Appl. No.: 17/955,887

(22) Filed: Sep. 29, 2022

(65) Prior Publication Data

US 2024/0111037 A1    Apr. 4, 2024

(51) Int. Cl.
| | |
|---|---|
| *G01S 7/527* | (2006.01) |
| *G01S 7/521* | (2006.01) |
| *G01S 7/56* | (2006.01) |
| *G01S 15/02* | (2006.01) |
| *G01S 15/89* | (2006.01) |

(52) U.S. Cl.
CPC .............. *G01S 7/527* (2013.01); *G01S 7/521* (2013.01); *G01S 7/56* (2013.01); *G01S 15/02* (2013.01); *G01S 15/89* (2013.01)

(58) Field of Classification Search
None
See application file for complete search history.

(56) References Cited

U.S. PATENT DOCUMENTS

| | | | | |
|---|---|---|---|---|
| 3,243,768 A | * | 3/1966 | Roshon, Jr. ............ | G10K 11/28 367/157 |
| 3,742,540 A | * | 7/1973 | Hill ........................ | B63C 11/50 367/173 |
| 4,031,502 A | * | 6/1977 | Lefaudeux ........... | G10K 11/205 367/160 |
| 4,314,098 A | * | 2/1982 | Maerfeld ............... | G10K 11/28 381/163 |

(Continued)

OTHER PUBLICATIONS

Wikipedia, Reflecting Telescope (Year: 2022).*
(Continued)

*Primary Examiner* — Isam A Alsomiri
*Assistant Examiner* — Vikas Atmakuri
(74) *Attorney, Agent, or Firm* — Nelson Mullins Riley & Scarborough

(57) ABSTRACT

A reflective sonar imaging system is provided. The system includes a reflective sonar imaging assembly. The reflective sonar imaging assembly includes a receiving aperture, a reflective surface defining a concave shape, and a receiver positioned between the reflective surface and the receiving aperture. The system also includes a display and processing circuitry. The reflective surface is configured to cause sonar returns to be reflected as reflected sonar returns toward the receiver. The sonar returns enter the reflective sonar imaging assembly through the receiving aperture, and the receiver is configured to receive the reflected sonar returns. The receiver is configured to generate sonar return data using the reflected sonar returns that are received, and the processing circuitry is configured to receive the sonar return data and generate one or more sonar images based on the sonar return data. The display is configured to present the sonar image(s).

20 Claims, 21 Drawing Sheets

(56) References Cited

U.S. PATENT DOCUMENTS

| | | | | | |
|---|---|---|---|---|---|
| 4,433,396 | A | * | 2/1984 | Johnson | G10K 11/28 367/122 |
| 4,719,605 | A | * | 1/1988 | Eder | G01S 7/52004 367/902 |
| 4,779,241 | A | * | 10/1988 | Atalar | G10K 15/00 367/151 |
| 8,300,499 | B2 | * | 10/2012 | Coleman | G01S 15/02 367/88 |
| 10,324,170 | B1 | * | 6/2019 | Engberg, Jr. | G01S 7/4818 |
| 11,397,263 | B2 | * | 7/2022 | Caspall | G01S 15/8902 |
| 2021/0132204 | A1 | * | 5/2021 | Caspall | G10K 11/28 |
| 2021/0330292 | A1 | * | 10/2021 | Song | A61B 8/4427 |

OTHER PUBLICATIONS

"Panoptix™ All-Seeing Sonar;" retrieved Dec. 1, 2020 from https://explore.garmin.com/en-US/panoptix/.

Blue View DP900 90 Fish Measurement; YouTube; Apr. 7, 2009; retrieved Dec. 1, 2020 from https://www.youtube.com/watch?v=qQyeAi4bi7Q.

Aris Explorer; *Sound Metrics*; retrieved Dec. 1, 2020 from http://www.soundmetrics.com/.

Image Gallery; *Sound Metrics*; retrieved Dec. 29, 2022 from http://www.soundmetrics.com/Image-Gallery.

* cited by examiner

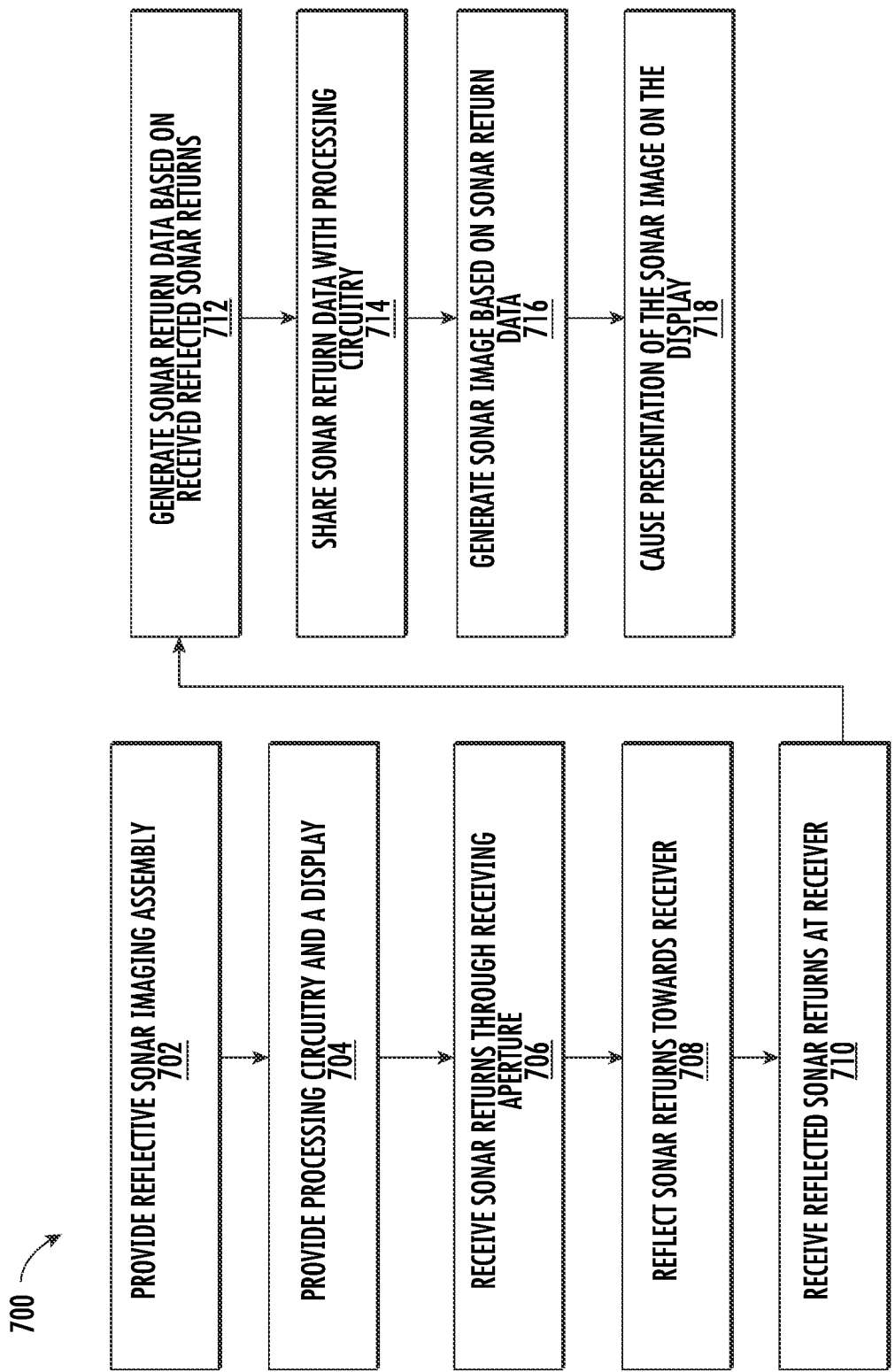

REFLECTIVE SURFACE BEAMFORMING

FIELD OF THE INVENTION

Embodiments of the present invention relate generally to a reflective sonar imaging assembly, a reflective sonar imaging system, and methods for using reflective sonar imaging assemblies to generate sonar return data and corresponding sonar imagery.

BACKGROUND OF THE INVENTION

With conventional beamforming techniques, scalability is often an issue. As additional receivers are added to a sonar array, the processing burden may undergo, for example, cubic growth (at a scale of N^3) in the case of conventional beamforming for an N×N element array. As a result, sonar devices deploying conventional beamforming techniques and having a large number of receivers requires advanced processors that are better able to handle the increased processing burden, and these advanced processors have an increased cost. The processing burden may eventually prevent the addition of further receivers, restricting the resolution that may be obtained with sonar devices using conventional beamforming techniques. Frequency steering has been implemented to obtain high resolution imaging from a low channel count, but scalability can also be an issue where frequency steering is used.

Reflective beamforming allows for very low processing operation counts even for the case of high signal channel counts, by mapping angular information to specific pixel locations in the image surface (imaging plane). As is the case for optics in video cameras, each pixel then provides the information for a particular direction from the imaging plane in the imager, and it suffices only to accurately transfer the pixel data at the update rate required for the imaging scenario. For example, suppose we had a 64×64 pixel (4096 pixels) imager, then each image frame requires the transfer of 4096 pixel values. If each pixel value requires 16 bits, then the frame is 65,536 bits of data. If we require four-inch range resolution, then the frame period must be 69 microseconds (14.4 frames per second). The transfer rate of pixel data is 944 MBits per second, which is easily handled by ethernet data transfer. This stream of data would provide a full three dimensional image with two angular dimensions (imager pixel values) and a radial dimension (time). A CCD could be applied, as in optical imaging, to transfer charge values accumulated in a capacitor used to integrate the rectified pixel voltage. For a fast algorithm, and the simplest beam forming, the number of multiplications and additions is on the order of 4096*log (4096)=14,796 operations for a 64×64 array for each range cell. If the beamforming is performed by the reflecting surfaces, then zero operations are required to obtain the beams for imaging. One need only transfer the pixel values for each range cell.

BRIEF SUMMARY OF THE INVENTION

Various embodiments provided herein provide a reflective sonar imaging assembly, a reflective sonar imaging system, and methods for using reflective sonar imaging assemblies to generate sonar return data. Sonar returns may be received in a reflective sonar imaging assembly through an aperture, and the sonar returns may be allowed to proceed to a reflective surface in the reflective sonar imaging assembly. The reflective surface may cause the sonar returns to be reflected to form reflected sonar returns. One or more receivers may be provided in the reflective sonar imaging assembly, and the receiver(s) may be configured to receive these reflected sonar returns. In some embodiments, receiver(s) may be configured to shift. However, receiver(s) may be stationary in other embodiments.

The reflective sonar imaging assembly may obtain sonar returns with a wide field of view. This field of view may be ninety (90) degrees or greater in some embodiments, and this field of view may be accomplished without the need for frequency steering or conventional beamforming techniques. By providing systems, assemblies, and methods that permit high-quality sonar return data to be obtained without use of conventional beamforming techniques, the sampling requirements and signal processing requirements for the generation of such sonar return data may be reduced, and the cost of making any reflective sonar imaging assemblies and systems may be reduced as the need for complex machinery and/or electronics for signal processing may be avoided. Hardware requirements may also be reduced by using the reflective sonar imaging assembly. Due to the lower sampling requirements, signal processing requirements, and the lower cost, the reflective sonar imaging assembly may be scalable so that additional receivers may be easily added. While the increased processing burden for additional receivers may grow exponentially at a scale of N^3 where conventional beamforming techniques are used, the increased processing burden for additional receivers may grow linearly (at a scale of N^1) where the reflective sonar imaging assembly is used. The reflective sonar imaging assembly offers improved live imaging sonar without significant increase in the cost of hardware to perform the signal acquisition and processing. Furthermore, the sampling rate for a reflective sonar imaging assembly may be determined by the range resolution alone and may be independent of any frequency and angular resolution of sonar. The reflective sonar imaging assembly may provide pixel-location-to-look-direction mapping (like a camera) for live imaging sonar.

Reflective sonar images assemblies provided in various embodiments described herein may possess improved scalability, and this scalability may be improved for two-dimensional or three-dimensional imagery. Where three-dimensional arrays are utilized, processing often needs to account for sonar data from multiple arrays, time data, and distance data. Additionally, where data is being processed to generate live sonar images, processing burdens may be increased for conventional beamforming techniques as the sonar images may need to be updated at regular intervals (e.g. 30 hertz). However, reflective sonar image assemblies help to reduce the processing requirements, and this may lead to an improvement in the quality of sonar return data.

In an example embodiment, a reflective sonar imaging system is provided. The reflective sonar imaging system includes a reflective sonar imaging assembly. The reflective sonar imaging assembly includes a receiving aperture, a reflective surface defining a concave shape, and a receiver positioned between the reflective surface and the receiving aperture. The reflective sonar imaging assembly also includes a display and processing circuitry. The reflective surface is configured to cause sonar returns to be reflected as reflected sonar returns toward the receiver. The sonar returns enter the reflective sonar imaging assembly through the receiving aperture, and the receiver is configured to receive the reflected sonar returns. The receiver is configured to generate sonar return data using the reflected sonar returns that are received, and the processing circuitry is configured to receive the sonar return data and generate one or more sonar images based on the sonar return data. The display is configured to present the one or more sonar images.

In some embodiments, the receiver may be configured to shift to various positions along a first arc, and the first arc may be radially curved. In related embodiments, the receiver may be configured to be manually shifted to various positions along the first arc. Additionally, in some embodiments, the receiver may be configured to be shifted to various positions along the first arc automatically.

In some embodiments, a plurality of receivers may be positioned between the reflective surface and the receiving aperture. The plurality of receivers may be stationary and may be positioned along a first arc that is radially curved. In some embodiments, a plurality of receivers may be positioned between the reflective surface and the receiving aperture. The plurality of receivers may be positioned along a first arc that is radially curved, and the plurality of receivers may be configured to shift to various positions along the first arc.

In some embodiments, the reflective sonar imaging system may be configured to generate a two-dimensional sonar image. A plurality of receivers may be positioned along a first arc that is between the reflective surface and the receiving aperture. The plurality of receivers may be stationary, or the plurality of receivers may be configured to shift along the first arc. In some embodiments, the reflective sonar imaging system also includes a three-dimensional array of receivers, and the reflective sonar imaging system is configured to generate a three-dimensional sonar image. The reflective surface may define a first axis and a second axis. The second axis may be perpendicular to the first axis, and the reflective surface may have a concave shape along both the first axis and the second axis.

In some embodiments, the receiver may be configured to shift to various positions along a first arc. The first arc may have a first radius. The reflective surface may define a second arc having a second radius that is greater than the first radius, and the first arc and the second arc may share a same center point. In some related embodiments, the second radius of the reflective surface may be 1.954 times greater than the first radius of the first arc. In further related embodiments, the first radius may be 25.591 millimeters and the second radius may be 50.000 millimeters.

In some embodiments, the reflective sonar imaging system may be configured to generate sonar images for a field of view that is greater than ninety degrees. Furthermore, in some embodiments, the receiver may be a single point receiver. In some embodiments, the reflective surface may extend about a circular arc, and the circular arc may extend at least 115 degrees. Additionally, the reflective sonar imaging assembly may include aluminum, silver, gold, magnesium fluoride, calcium fluoride, high air content finely celled rubber foam material, other metals, or metal oxides at the reflective surface in some embodiments. In some embodiments, the processing circuitry may be configured to filter sonar returns having lower intensities.

In another example embodiment, a reflective sonar imaging assembly is provided. The reflective sonar imaging assembly includes a receiving aperture, a reflective surface defining a concave shape, and a receiver positioned between the reflective surface and the receiving aperture. The reflective surface is configured to cause sonar returns to be reflected as reflected sonar returns towards the receiver. The sonar returns enter the reflective sonar imaging assembly through the receiving aperture, and the receiver is configured to receive the reflected sonar returns. The receiver is configured to generate sonar return data using the reflected sonar returns that are received.

In some embodiments, the receiver may be configured to shift to various positions along a first arc, which may have a first radius. The reflective surface may define a second arc having a second radius that is greater than the first radius, and the first arc and the second arc may share a same center point.

In some embodiments, a plurality of receivers may be positioned between the reflective surface and the receiving aperture. The plurality of receivers may be positioned along a first arc, and the first arc may have a first radius. The reflective surface may define a second arc having a second radius that is greater than the first radius, and the first arc and the second arc may share a same center point.

In another example embodiment, a method for generating sonar images is provided. The method includes providing a reflective sonar imaging assembly including a receiving aperture, a reflective surface defining a concave shape, and a receiver positioned between the reflective surface and the receiving aperture. The method also includes providing processing circuitry and a display. The reflective surface is configured to cause sonar returns to be reflected as reflected sonar returns towards the receiver when the sonar returns enter the reflective sonar imaging assembly through the receiving aperture. The receiver is configured to receive the reflected sonar returns. The method includes receiving the reflected sonar returns at the receiver and generating sonar return data based on the reflected sonar returns. The method further includes generating one or more sonar images based on the sonar return data, and causing presentation of the one or more sonar images on the display.

BRIEF DESCRIPTION OF THE DRAWINGS

Figure 1:
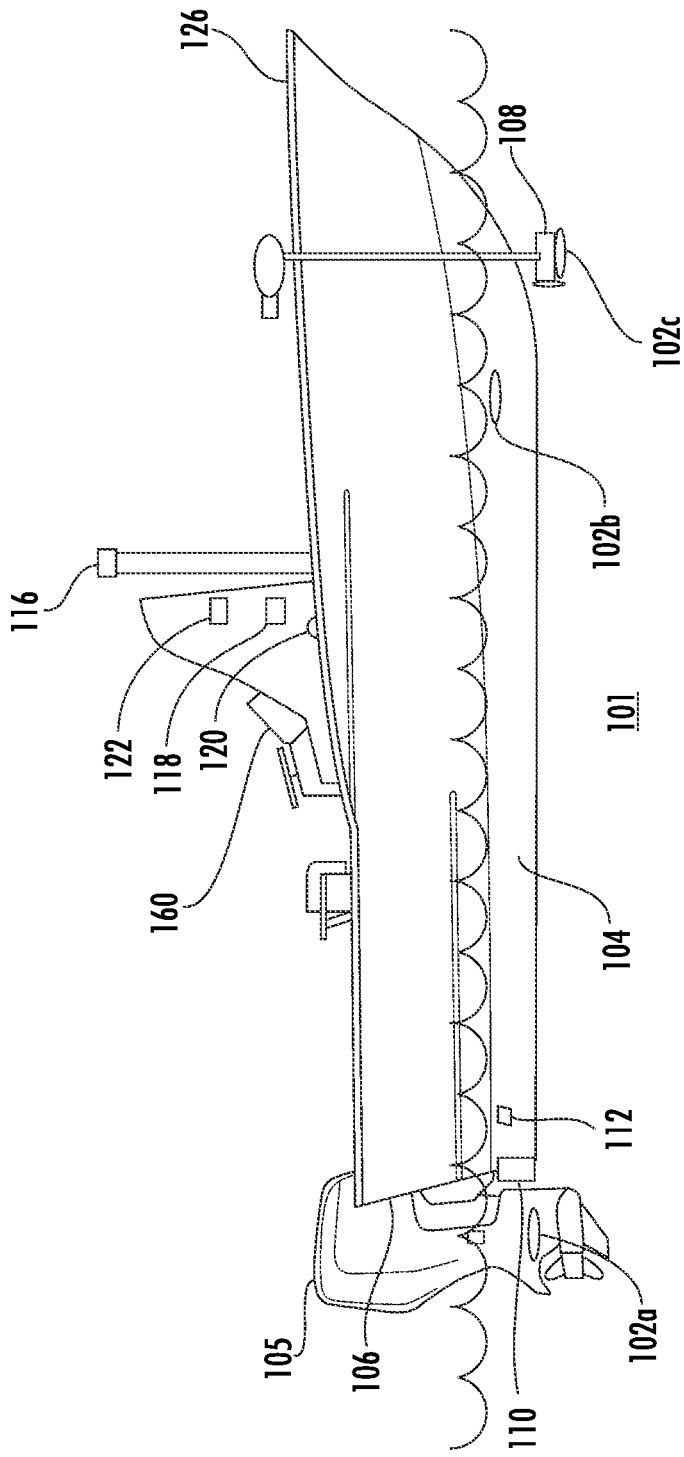
Figure 2:
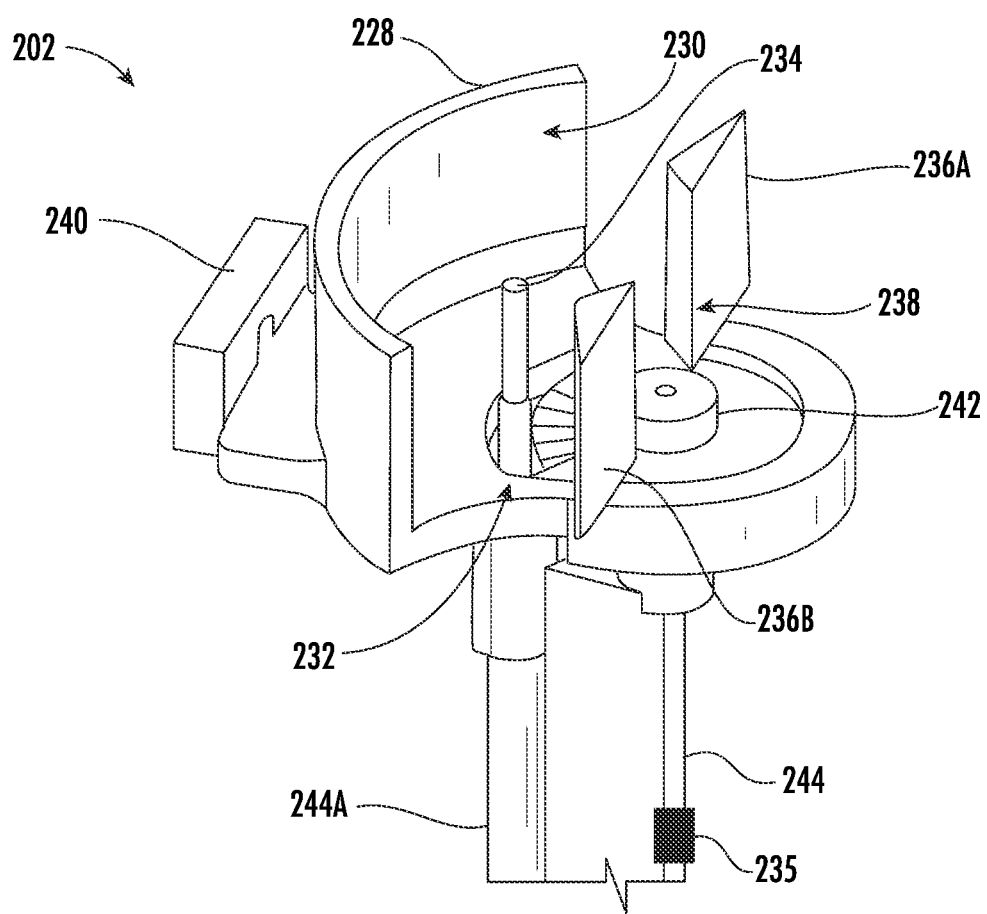
Figure 3A:
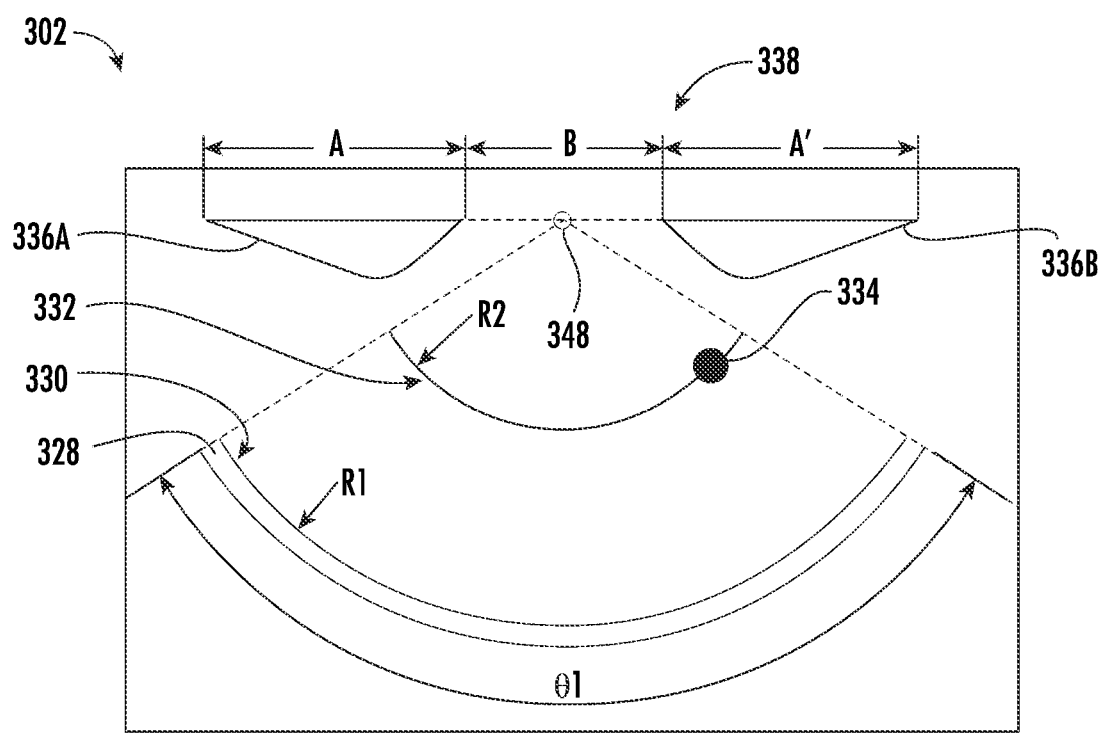
Figure 3B:
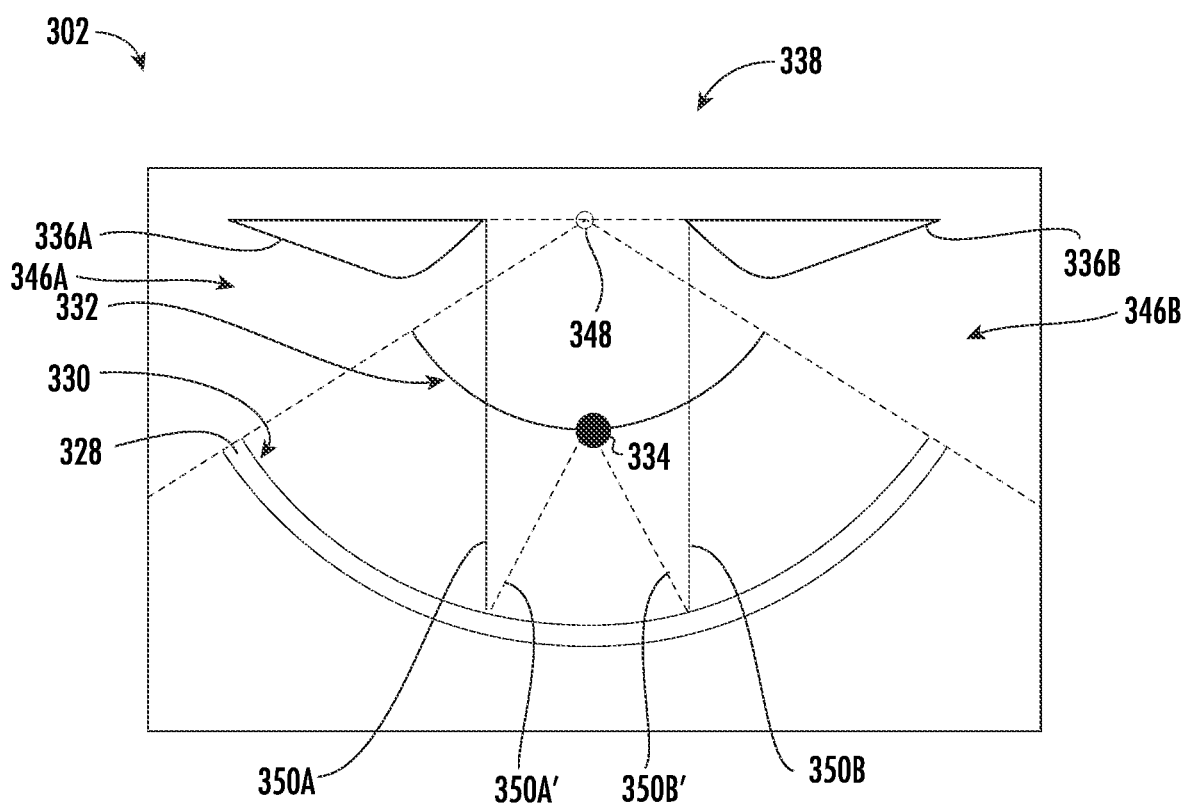
Figure 3C:
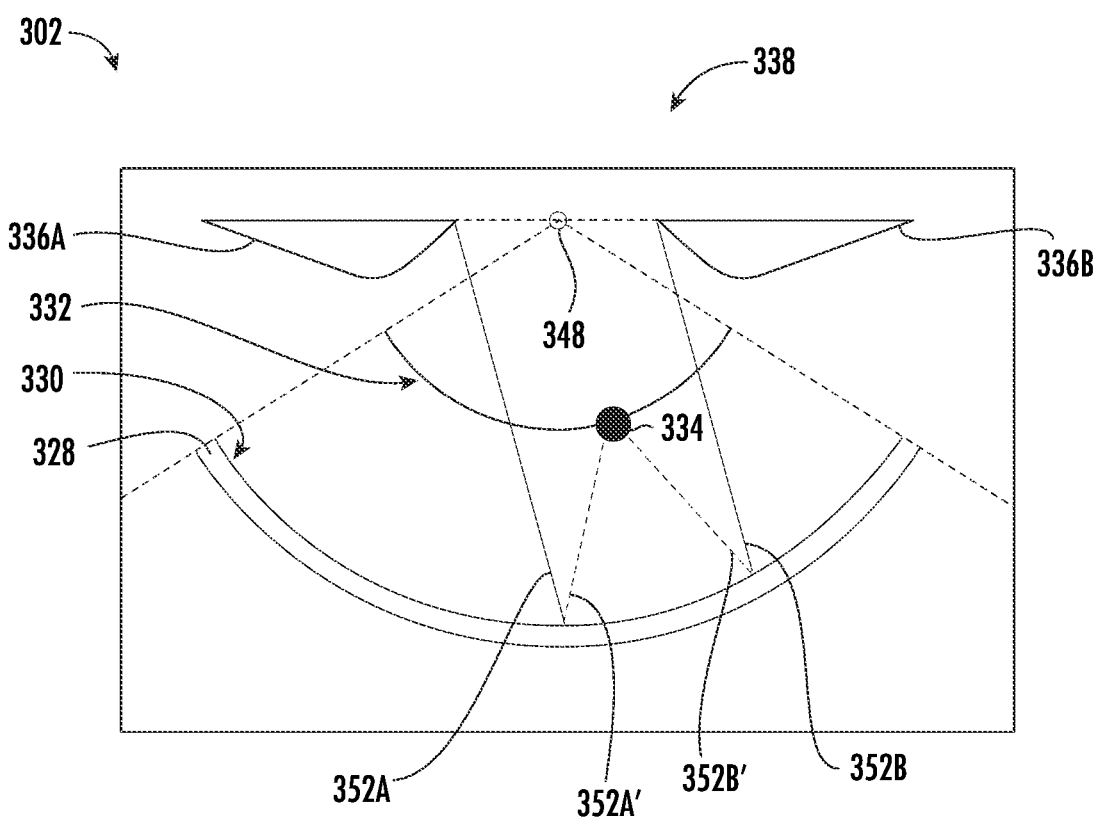
Figure 3D:
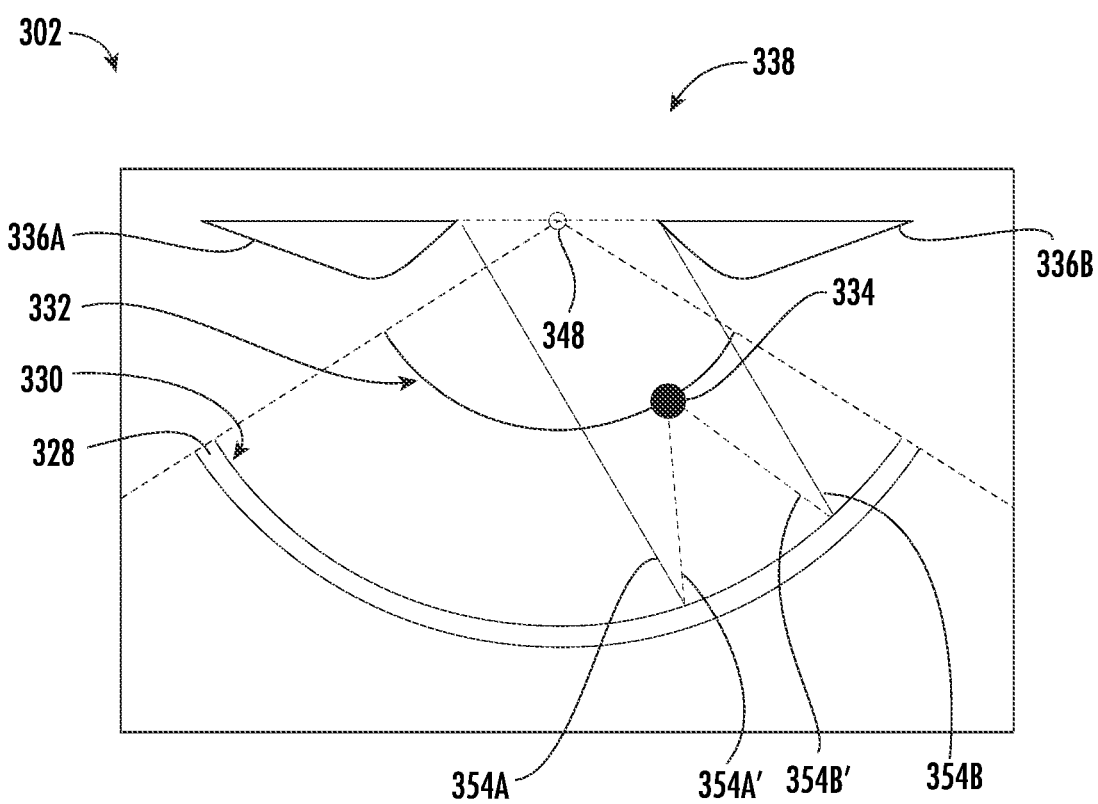
Figure 3E:
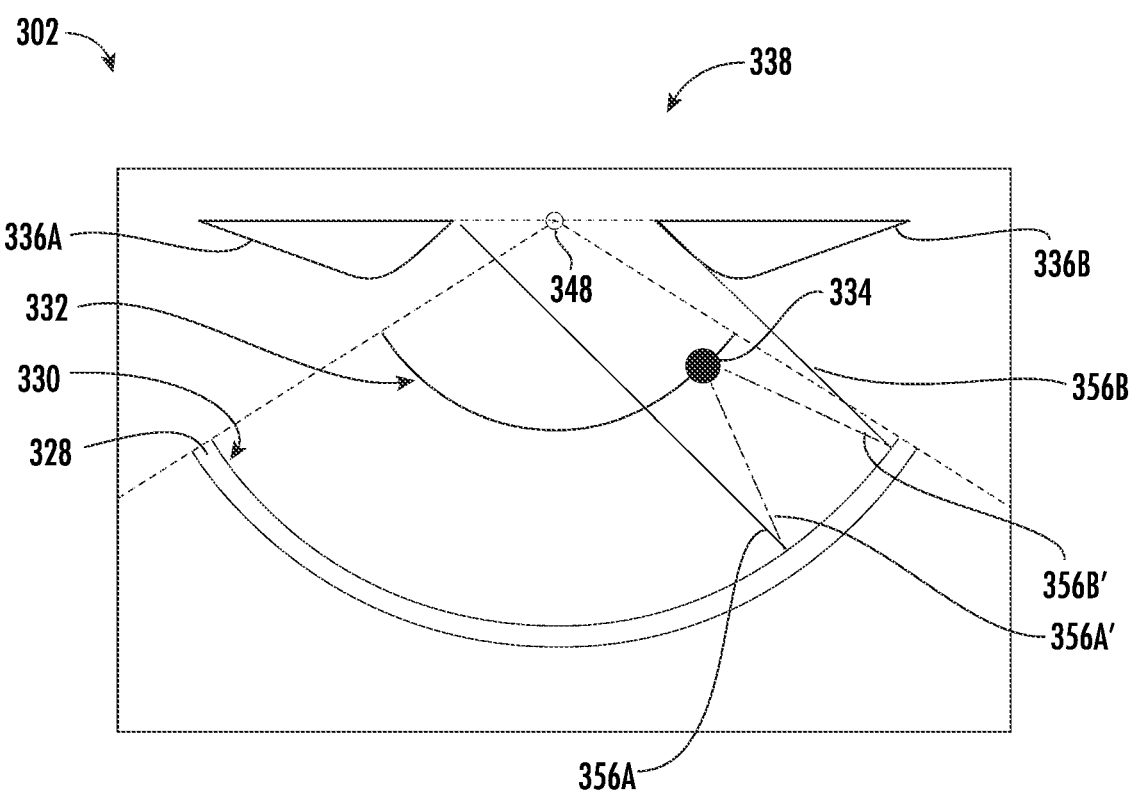
Figure 3F:
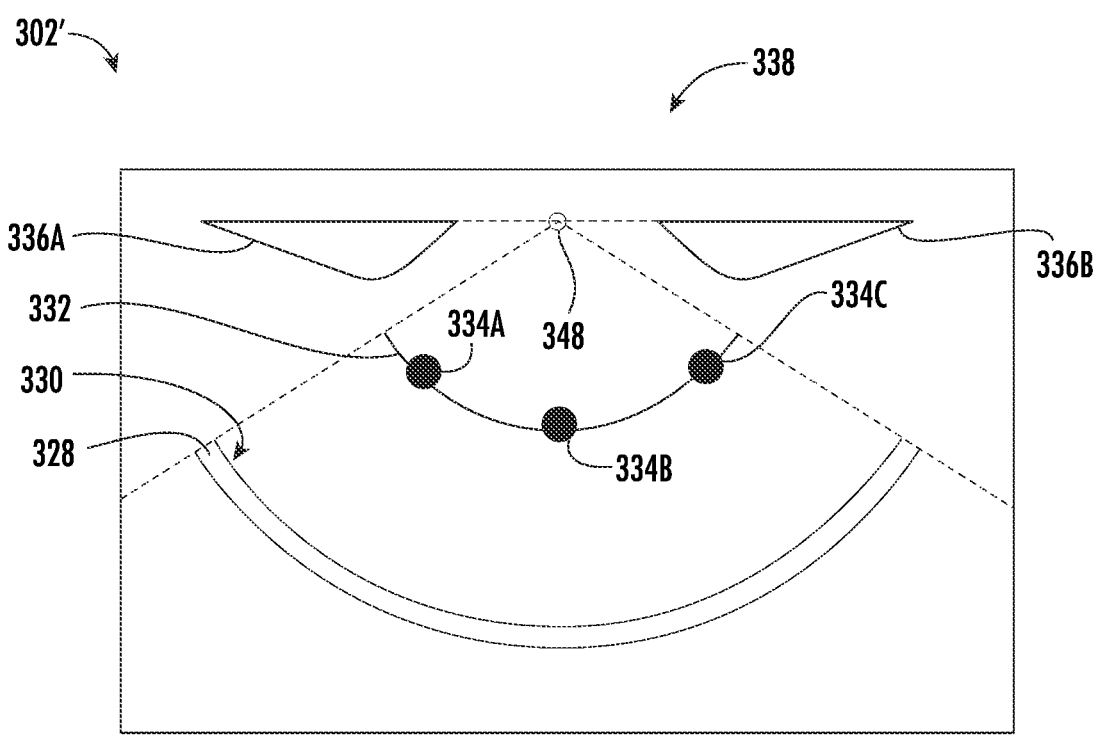
Figure 3G:
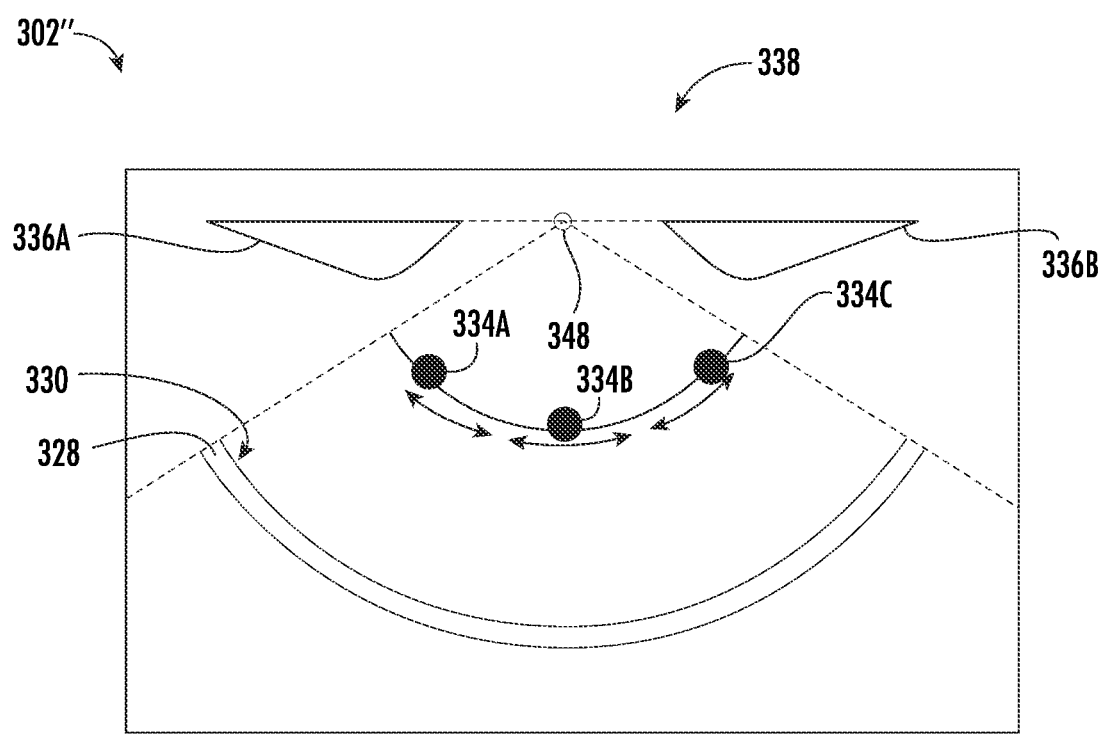
Figure 4A:
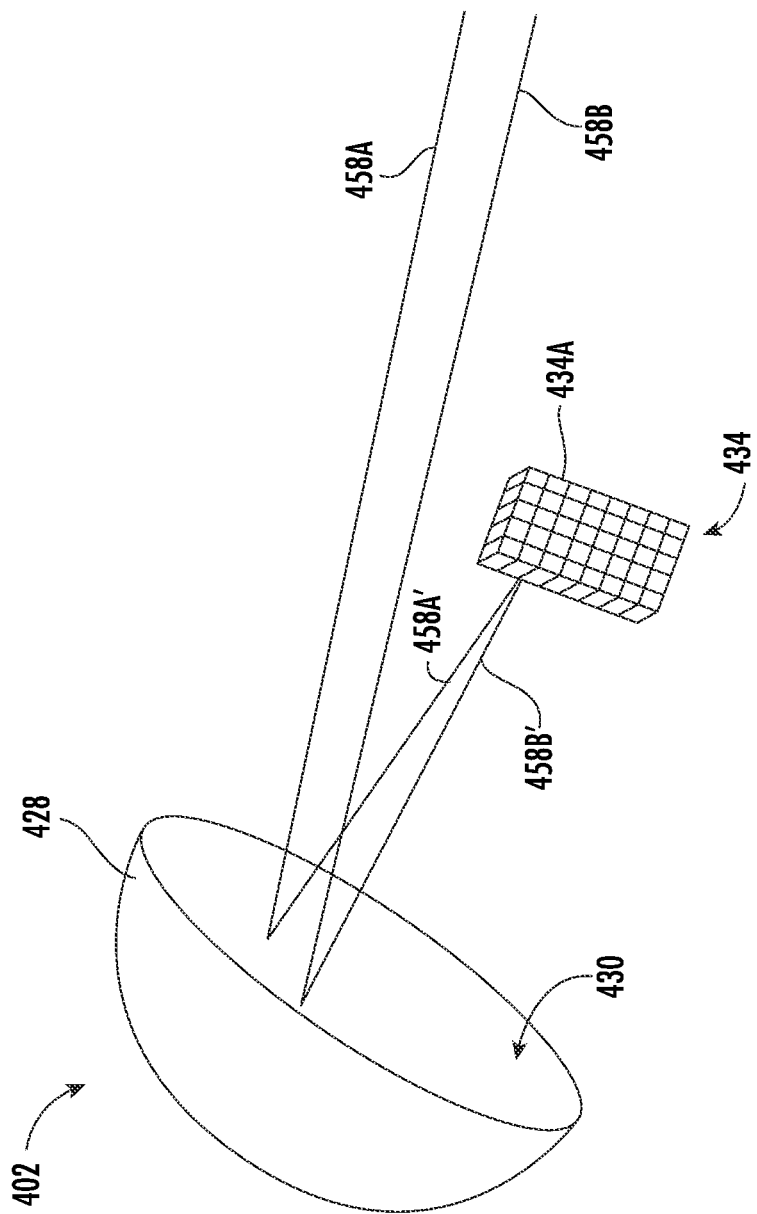
Figure 4B:
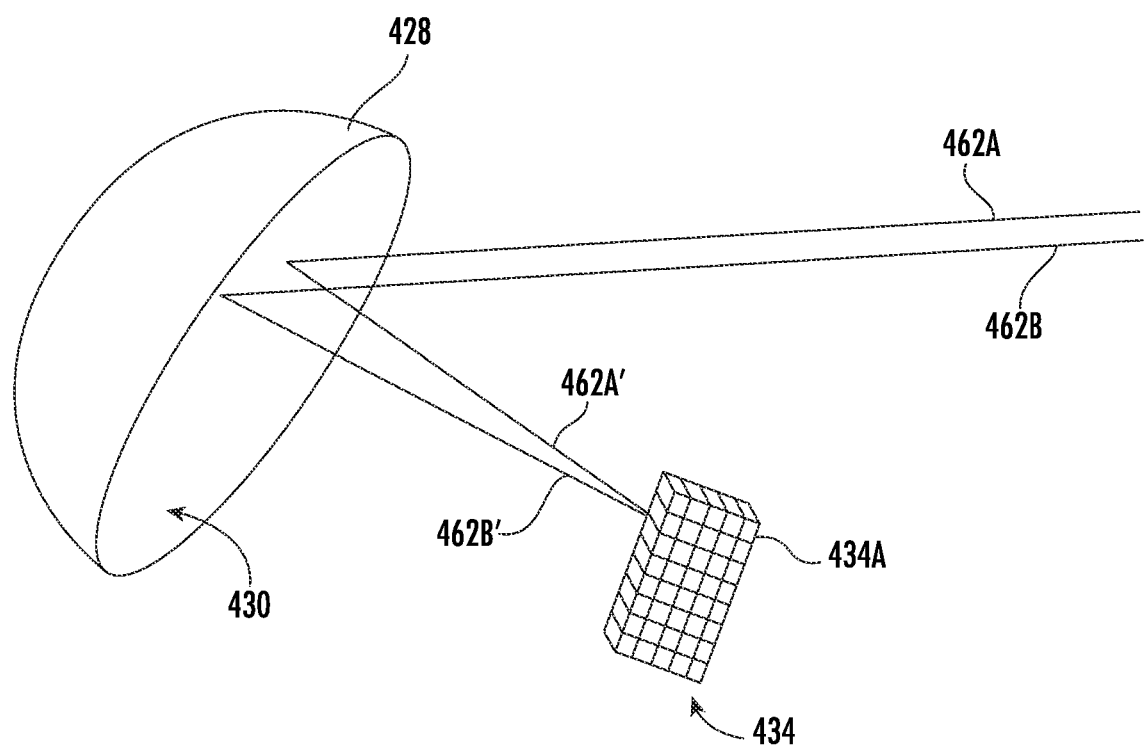
Figure 4C:
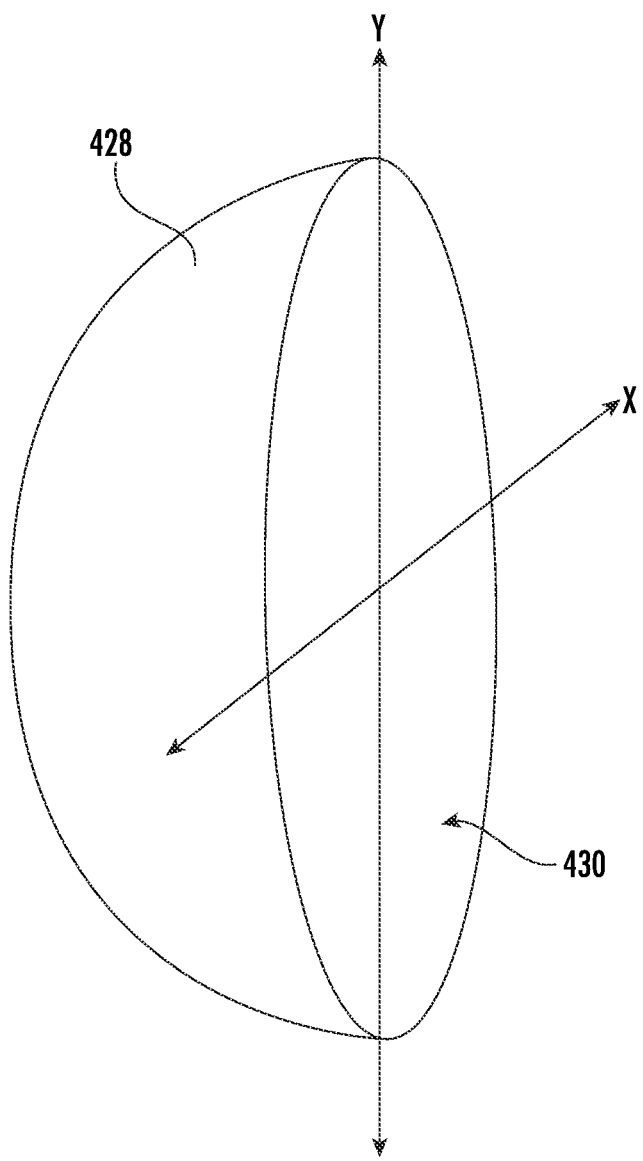
Figure 6:
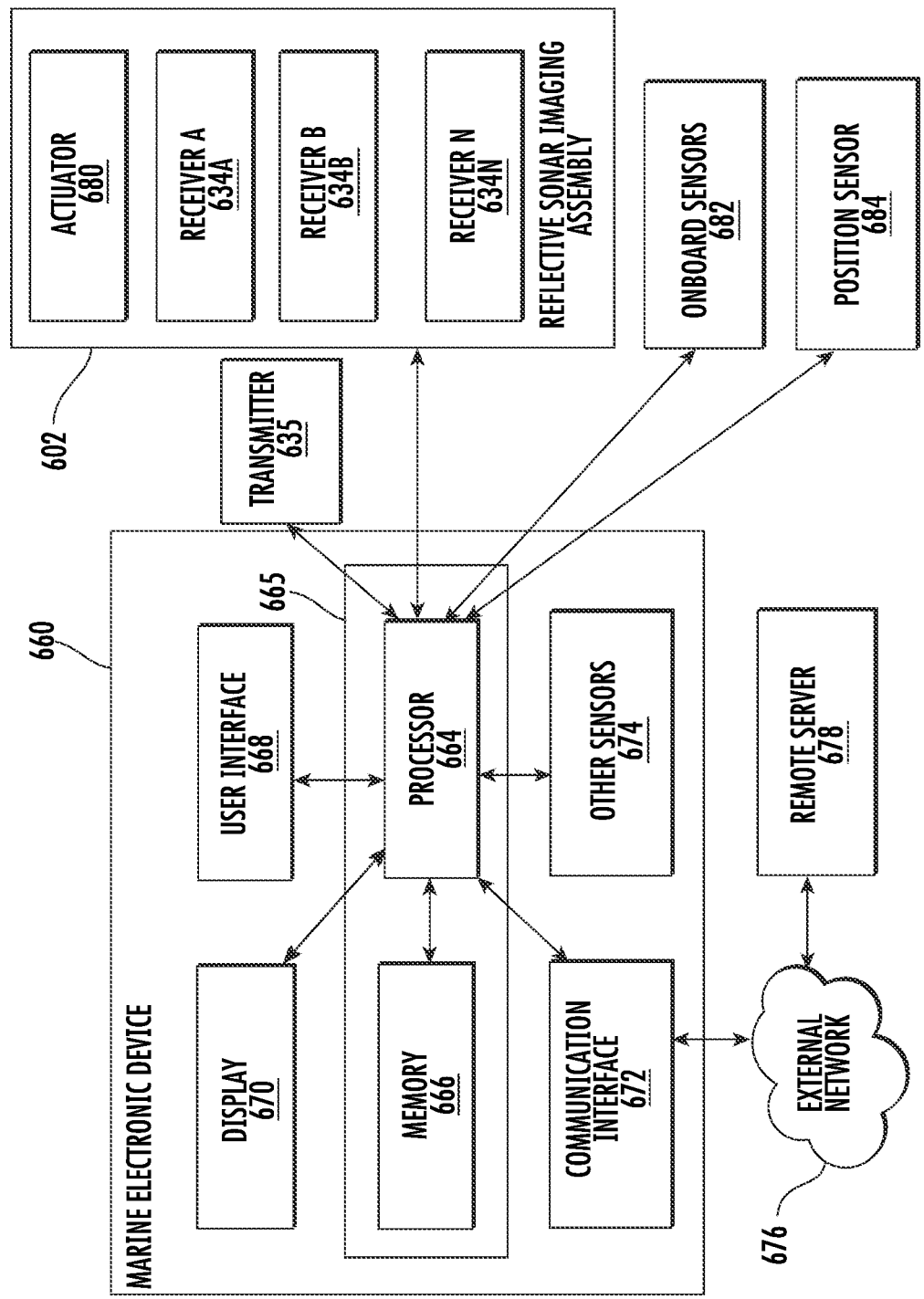

Having thus described the invention in general terms, reference will now be made to the accompanying drawings, which are not necessarily drawn to scale, and wherein:

FIG. 1 illustrates a schematic view of an example watercraft, in accordance with some embodiments discussed herein;

FIG. 2 illustrates a perspective view of an example reflective sonar imaging assembly, in accordance with some embodiments discussed herein;

FIG. 3A illustrates an example cross-sectional view of an example reflective sonar imaging assembly, in accordance with some embodiments discussed herein;

FIGS. 3B-3E illustrate example views of the reflective sonar imaging assembly of FIG. 3A where the receiver is placed at different positions in the reflective sonar imaging assembly, in accordance with some embodiments discussed herein;

FIG. 3F illustrates an example cross-sectional view of an example reflective sonar imaging assembly where multiple stationary receivers are provided, in accordance with some embodiments discussed herein;

FIG. 3G illustrates an example cross-sectional view of an example reflective sonar imaging assembly where multiple receivers are provided that are configured to shift along an arc, in accordance with some embodiments discussed herein;

FIGS. 4A-4B illustrate schematic views of an example three-dimensional reflective sonar imaging assembly, in accordance with some embodiments discussed herein;

FIG. 4C illustrates a perspective view of an example three-dimensional reflective wall having a reflective surface that may be used in a three-dimensional reflective sonar imaging assembly, in accordance with some embodiments discussed herein;

FIGS. 5A-5G illustrate various plots illustrating sonar return patterns for sonar returns from receivers positioned at various locations, in accordance with some embodiments discussed herein;

FIG. 6 illustrates a block diagram with electrical components that may be provided in a reflective sonar imaging system, in accordance with some embodiments discussed herein; and FIG. 7 illustrates a flow chart showing a method for generating sonar images, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals generally refer to like elements throughout. For example, reference numerals 230, 330, and 430 are each used for reflective surfaces. Additionally, any connections or attachments may be direct or indirect connections or attachments unless specifically noted otherwise.

FIG. 1 illustrates an example watercraft 126 including various marine devices, in accordance with some embodiments discussed herein. As depicted in FIG. 1, the watercraft 126 (e.g., a vessel) is configured to traverse a marine environment, e.g. body of water 101, and may use one or more sonar transducer assemblies 102A, 102B, and 102C disposed on and/or proximate to the watercraft 126. Notably, an example watercraft 126 contemplated herein may be surface watercraft, submersible watercraft, or any other implementation known to those skilled in the art. The transducer assemblies 102A, 102B, and 102C may each include one or more transducer elements (such as in the form of the example assemblies described herein) configured to transmit sound waves into a body of water 101, receive sonar returns from the body of water 101, and convert the sonar returns into sonar return data. Various types of sonar transducers may be provided—for example, a linear downscan sonar transducer, a conical downscan sonar transducer, a sonar transducer array, or a sidescan sonar transducer may be used.

Depending on the configuration, the watercraft 126 may include a primary motor 105, which may be a main propulsion motor such as an outboard or inboard motor. Additionally, the watercraft 126 may include a trolling motor 108 configured to propel the watercraft 126 or maintain a position. The one or more transducer assemblies (e.g., 102A, 102B, and/or 102C) may be mounted in various positions and to various portions of the watercraft 126 and/or equipment associated with the watercraft 126. For example, the transducer assembly may be mounted proximate to the transom 106 of the watercraft 126, such as depicted by transducer assembly 102A. The transducer assembly may be mounted to the bottom or side of the hull 104 of the watercraft 126, such as depicted by transducer assembly 102B. The transducer assembly may be mounted to the trolling motor 108, such as depicted by transducer assembly 102C.

The watercraft 126 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 126 although other places on the watercraft 126 are contemplated. Likewise, additionally or alternatively, a remote device (such as a user's mobile device) may include functionality of a marine electronic device.

The watercraft 126 may also comprise other components within the one or more marine electronic devices 160 or at the helm. In FIG. 1, the watercraft 126 comprises a radar 116, which is mounted at an elevated position (although other positions relative to the watercraft 126 are also contemplated). The watercraft 126 also comprises an Automatic Identification System (AIS) transceiver 118, a direction sensor 120, and a camera 122, and these components are each positioned at or near the helm (although other positions relative to the watercraft 126 are also contemplated). Additionally, the watercraft 126 comprises a rudder 110 at the stern of the watercraft 126, and the rudder 110 may be positioned on the watercraft 126 so that the rudder 110 will rest in the body of water 101. In other embodiments, these components may be integrated into the one or more marine electronic devices 160 or other devices. Another example device on the watercraft 126 includes a temperature sensor 112 that may be positioned so that it rests within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

Various reflective sonar imaging assemblies are contemplated that may be used to generate high quality sonar return data and sonar images. FIG. 2 illustrates a perspective view of an example reflective sonar imaging assembly 202. The reflective sonar imaging assembly 202 is configured to generate two-dimensional sonar return data that may be used to form a two-dimensional sonar image. The reflective sonar imaging assembly 202 includes a reflective wall 228, and the reflective wall 228 includes a reflective surface 230. The reflective surface 230 defines a concave shape. The reflective sonar imaging assembly 202 also includes a recess 232, and a receiver 234 extends through the recess 232. The recess 232 and the receiver 234 are positioned between the reflective surface 230 and the receiving aperture 238. Metals such as aluminum, silver, gold, or other metals may be used at the reflective surface 230 in some embodiments. Alternatively, other materials such as magnesium fluoride, calcium fluoride, high air content finely celled rubber foam material, other metal oxides, or other materials may be used at the reflective surface 230 in some embodiments. High-reflection coatings may be used to form the reflective surface 230 in some embodiments as well, and magnesium fluoride, calcium fluoride, metal oxides, high air content finely celled rubber foam material, and other materials may be used in the high-reflection coatings. However, other types of material may be used to form the reflective surface 230. Additionally, the receiver 234 may be a single point receiver. In some embodiments, the receiver 234 may be a hydrophone probe.

The reflective sonar imaging assembly 202 also includes a receiving aperture 238 that is defined by a first wall 236A and a second wall 236B in the illustrated embodiment. The reflective sonar imaging assembly 202 is configured to permit sonar returns to enter the reflective sonar imaging assembly 202 through the receiving aperture 238 so that the sonar returns may proceed to the reflective surface 230. Once the sonar returns reach the reflective surface 230, the reflective surface 230 is configured to cause sonar returns to be reflected as reflected sonar returns toward the receiver 234, and the receiver 234 is configured to receive the reflected sonar returns. The receiver 234 is configured to generate sonar return data using the reflected sonar returns that are received.

The recess 232 forms a receiver arc that may, for example, be radially curved. In some embodiments, the receiver 234 may be shifted to various positions along the receiver arc formed by the recess 232. This may be accomplished by rotating the rotational member 244 about the connector 242. Rotation of the rotating member 244 causes the bar 244A and the receiver 234 attached to the bar 244A to shift along the receiver arc of the recess 232. By shifting the receiver 234 to different positions, different sonar return patterns may be generated at each position. The reflective sonar imaging assembly 202 also includes a mount 240, and this mount 240 is configured to permit a connection of the reflective sonar imaging assembly 202 to a watercraft.

A transmitter 235 may be provided that is configured to transmit sonar beams into the body of water 101 (see FIG. 1). The transmitter 235 is provided on the rotating member 244 of the sonar imaging assembly 202 in the illustrated embodiment. However, the transmitter 235 may be provided at other locations in other embodiments. For example, the transmitter 235 may be provided on the first wall 236A or the second wall 236B, the transmitter 235 may be provided at another location on the sonar imaging assembly 202, or the transmitter 235 may be provided away from the sonar imaging assembly 202 at another location on the watercraft 126 (see FIG. 1).

Further details regarding the operation of the reflective sonar imaging assembly can be seen in FIGS. 3A-3E. As can be seen in these figures, sonar returns may be reflected to generate reflected sonar returns that may be received at a receiver. FIG. 3A illustrates a schematic view of an example reflective sonar imaging assembly 302. A reflective wall 328 is provided in the reflective sonar imaging assembly 302. This reflective wall 328 possesses a reflective surface 330. The reflective surface 330 extends about a circular arc and has a radius of curvature in the illustrated embodiment, but the reflective surface 330 may not have a consistent radius of curvature in other embodiments. A radius (R1) of the reflective surface 330 may possess a variety of sizes. In the illustrated embodiment, the radius (R1) of the reflective surface 330 of the reflective wall 328 is 50.000 millimeters. The reflective wall 328 and reflective surface 330 may extend along an arc for an angle θ1. This angle θ1 is 115 degrees in the illustrated embodiment, but the reflective wall 328 and reflective surface 330 may possess a greater or smaller size in other embodiments (e.g., 45 degrees, 80 degrees, 90 degrees, an angle value within a range of 45 degrees to 135 degrees, within a range of 90 degrees to 135 degrees, within a range of 30 degrees to 150 degrees, within a range of 90 degrees to 150 degrees, within a range of 90 degrees to 180 degrees, etc.).

Additionally, a first wall 336A and a second wall 336B are provided, and the two walls 336A, 336B define a receiving aperture 338 between the two walls 336A, 336B. The first wall 336A may have a width A, and the second wall 336B may have a width A'. The width A and the width A' may possess a variety of sizes, but these widths A, A' are both 32 millimeters in the illustrated embodiment. A receiving aperture 338 is provided between the first wall 336A and the second wall 336B. The receiving aperture 338 has a width B, and this width B may possess a variety of sizes. In the embodiment illustrated in FIG. 3A, the width B is 25 millimeters.

A receiver 334 is also provided. This receiver 334 is positioned in a receiver arc 332, and the receiver arc 332 may be configured to permit the receiver 334 to shift along the receiver arc 332 to different positions. In some embodiments, the position of the receiver 334 along the receiver arc 332 may be manually adjusted by a user. However, in other embodiments, the receiver 334 may be automatically adjusted without the need for any manual adjustment. For example, an actuator 680 (see FIG. 6) may be configured to cause receiver(s) 334 to shift along the receiver arc 332. Example actuators 680 may include a motor such as a servomotor, a pneumatic or hydraulic cylinder, etc., but other actuators 680 may be used.

The receiver arc 332 may be radially curved in some embodiments. In the illustrated embodiment, the radius (R2) of the receiver arc 332 is approximately 25.591 millimeters, but receiver arcs having other sizes and shapes are also contemplated. In some embodiments, the radius (R2) of the receiver arc 332 is 1.954 times greater than the radius (R1) of the reflective surface 330. The circular arc formed by the reflective surface 330 and the receiver arc 332 may share a same center point 348.

FIGS. 3B-3E illustrate schematic views of the reflective sonar imaging assembly 302 of FIG. 3A where the receiver 334 is placed at different positions in the reflective sonar imaging assembly 302. Looking first at FIG. 3B, the receiver 334 is positioned at a central location on the receiver arc 332. When the receiver 334 is positioned at this location, the receiver 334 may be configured to receive all sonar return data advancing towards the reflective sonar imaging assembly 302 at approximately the same angle. The first sonar return 350A and the second sonar return 350B both advance through the receiving aperture 338 until the sonar returns reflect off of the reflective surface 330. The first sonar return 350A and the second sonar return 350B both advance at a receiving angle that is approximately parallel to the forward facing direction of the reflective sonar imaging assembly 302. Upon reaching the reflective surface 330, the first sonar return 350A is reflected to form a first reflected sonar return 350A' that may be detected at the receiver 334 and the second sonar return 350B is reflected to form a second reflected sonar return 350B' that may be detected at the receiver 334. While only two sonar returns 350A, 350B are illustrated in FIG. 3B, the receiver 334 may be configured to detect other sonar returns advancing at a receiving angle that is approximately parallel to the forward facing direction of the reflective sonar imaging assembly 302 when the receiver 334 is positioned as shown in FIG. 3B. Notably, other angled sonar returns are also received, but may not form a large part of the received sonar return data and may be filtered during sonar image generation.

Additionally, a first opening 346A may be provided between the first wall 336A and the reflective wall 328, and a second opening 346B may be provided between the second wall 336B and the reflective wall 328. To the extent that a sonar return enters the receiving aperture 338 at an extreme angle, the sonar returns may exit through the first opening 346A or the second opening 346B. For example, a sonar return entering the receiving aperture 338 at an extreme angle may in some cases travel directly through the first opening 346A or the second opening 346B without being reflected off of the reflective surface 330. As another example, a sonar return entering the receiving aperture 338 at an extreme angle may in some cases be reflected off of the reflective surface 330 and/or the bottom surface of the first wall 336A or the second wall 336B so that any reflected sonar return is directed out through the first opening 346A or the second opening 346B.

The receiver 334 may be placed at other positions along the receiver arc 332 so that the receiver 334 may detect sonar returns advancing from other receiving angles. Looking at FIG. 3C, the receiver 334 is positioned further along the receiver arc 332 towards the right. The receiver 334 of FIG. 3C is shifted approximately 15 degrees to the right relative to the receiver illustrated in FIG. 3B. At this position, the receiver 334 is configured to receive a third sonar return 352A and a fourth sonar return 352B. The third sonar return 352A and the fourth sonar return 352B both advance at an angle that is offset by approximately 15 degrees from the forward facing direction of the reflective sonar imaging assembly 302. The third sonar return 352A and the fourth sonar return 352B advance until the sonar returns reach the reflective surface 330. Upon reaching the reflective surface 330, the third sonar return 352A is reflected to form a third reflected sonar return 352A' that may be detected at the receiver 334 and the fourth sonar return 352B is reflected to form a fourth reflected sonar return 352B' that may be detected at the receiver 334. While only two sonar returns 352A, 352B are illustrated in FIG. 3C, the receiver 334 may be configured to detect other sonar returns advancing at a receiving angle that is offset by approximately 15 degrees from the forward facing direction of the reflective sonar imaging assembly 302 when the receiver 334 is positioned as shown in FIG. 3C.

Turning now to FIG. 3D, the receiver 334 is positioned further along the receiver arc 332 towards the right. The receiver 334 of FIG. 3D is shifted approximately 30 degrees to the right relative to the receiver illustrated in FIG. 3B. At this position, the receiver 334 is configured to receive a fifth sonar return 354A and a sixth sonar return 354B. The fifth sonar return 354A and the sixth sonar return 354B both advance at an angle that is offset by approximately 30 degrees from the forward facing direction of the reflective sonar imaging assembly 302. The fifth sonar return 354A and the sixth sonar return 354B advance until the sonar returns reach the reflective surface 330. Upon reaching the reflective surface 330, the fifth sonar return 354A is reflected to form a fifth reflected sonar return 354A' that may be detected at the receiver 334 and the sixth sonar return 354B is reflected to form a sixth reflected sonar return 354B' that may be detected at the receiver 334. While only two sonar returns 354A, 354B are illustrated in FIG. 3D, the receiver 334 may be configured to detect other sonar returns advancing at a receiving angle that is offset by approximately 30 degrees from the forward facing direction of the reflective sonar imaging assembly 302 when the receiver 334 is positioned as shown in FIG. 3D.

Turning now to FIG. 3E, the receiver 334 is positioned further along the receiver arc 332 towards the right. The receiver 334 of FIG. 3E is shifted approximately 45 degrees to the right relative to the receiver illustrated in FIG. 3B. At this position, the receiver 334 is configured to receive a seventh sonar return 356A and an eighth sonar return 356B. The seventh sonar return 356A and the eighth sonar return 356B both advance at an angle that is offset by approximately 45 degrees from the forward facing direction of the reflective sonar imaging assembly 302. The seventh sonar return 356A and the eighth sonar return 356B advance until the sonar returns reach the reflective surface 330. Upon reaching the reflective surface 330, the seventh sonar return 356A is reflected to form a seventh reflected sonar return 356A' that may be detected at the receiver 334 and the eighth sonar return 356B is reflected to form an eighth reflected sonar return 356B' that may be detected at the receiver 334. While only two sonar returns 356A, 356B are illustrated in FIG. 3E, the receiver 334 may be configured to detect other sonar returns advancing at a receiving angle that is offset by approximately 45 degrees from the forward facing direction of the reflective sonar imaging assembly 302 when the receiver 334 is positioned as shown in FIG. 3E.

The receiver 334 is configured to generate sonar return data using the reflected sonar returns that are received by the receiver 334. Processing circuitry 665 (see FIG. 6) is provided that is configured to receive the sonar return data, and the processing circuitry 665 is configured to generate one or more sonar images based on the sonar return data. Furthermore, a display 670 (see FIG. 6) is provided, and the processing circuitry is configured to cause the presentation of the one or more sonar images on the display 670.

The reflective sonar imaging assembly 302 may be configured to generate sonar images for a field of view that is greater than ninety degrees in some embodiments. However, the field of view may be less than ninety degrees where a user wishes to focus on a particular area. As can be seen in FIG. 3E, sonar returns 356A and sonar returns 356B may approach the reflective sonar imaging assembly 302 at an approach angle that is offset by approximately 45 degrees from the forward facing direction of the reflective sonar imaging assembly 302. When a stationary receiver on the opposite side of the assembly is used or when the receiver is shifted to the opposite side of the assembly, sonar returns may approach the reflective sonar imaging assembly 302 at an approach angle that is offset by approximately −45 degrees from the forward facing direction of the reflective sonar imaging assembly 302. Thus, a 90 degree field of view may be accomplished.

FIG. 3F illustrates a schematic view of an example reflective sonar imaging assembly 302' where multiple stationary receivers are provided. The reflective sonar imaging assembly 302' includes a first receiver 334A, a second receiver 334B, and a third receiver 334C, and each of these receivers are stationary in the sonar imaging assembly 302'. While only three receivers are illustrated in the sonar imaging assembly 302' of FIG. 3F, any number of receivers may be provided in other embodiments. The receivers are spaced apart from each other along the receiver arc 332, and the receivers may be evenly spaced along the receiver arc 332 in some embodiments. By providing multiple receivers, sonar returns at different approach angles are received at the receivers, improving the quality and resolution of any sonar return data and/or sonar image that is created.

FIG. 3G illustrates a schematic view of an example reflective sonar imaging assembly 302" where multiple receivers are provided that are configured to shift along the receiver arc 332 (see FIG. 3F). As illustrated, the reflective sonar imaging assembly 302" has a first receiver 334A, a second receiver 334B, and a third receiver 334C. These receivers shift along the receiver arc 332 as illustrated by the arrowed lines underneath the illustrated receivers. Because the receivers shift, the receivers are able to receive sonar returns at a greater number of approach angles, and this may improve the quality and resolution of any sonar return data and/or sonar image that is created.

Three-dimensional reflective sonar imaging assemblies may also be provided, permitting the creation of three-dimensional sonar return data and/or three-dimensional sonar images. FIGS. 4A-4B illustrate schematic views of an example three-dimensional reflective sonar imaging assembly 402. FIG. 4C illustrates a perspective view of an example three-dimensional reflective wall 428 having a reflective surface 430 that may be used in a three-dimensional reflective sonar imaging assembly 402.

The three-dimensional reflective wall 428 of FIG. 4A reflects sonar returns towards receivers 434A in a three-dimensional array 434 of receivers. For example, in FIG. 4A, a first sonar return 458A is reflected off of the reflective surface 430 of the reflective wall 428 to form a first reflected sonar return 458A', and the first reflected sonar return 458A' may be received at a receiver 434A. FIG. 4A also illustrates a second sonar return 458B being reflected off of the reflective surface 430 of the reflective wall 428 to form a second reflected sonar return 458B', and the second reflected sonar return 458B' may be received at a receiver 434A. The first sonar return 458A and the second sonar return 458B travel parallel to each other so that they share the same approach angle.

Turning now to FIG. 4B, a third sonar return 462A and a fourth sonar return 462B are also illustrated. The third sonar return 462A is reflected off of the reflective surface 430 of the reflective wall 428 to form a third reflected sonar return 462A', and the third reflected sonar return 462A' may be received at a receiver 434A. FIG. 4B also illustrates a fourth sonar return 462B being reflected off of the reflective surface 430 of the reflective wall 428 to form a fourth reflected sonar return 462B', and the fourth reflected sonar return 462B' may be received at a receiver 434A.

The receivers 434A of the three-dimensional array 434 are configured to generate sonar return data using the reflected sonar returns that are received by the receivers 434A. The reflective sonar imaging system may be configured to generate one or more three-dimensional sonar images based on the sonar return data. In some embodiments, processing circuitry 665 (see FIG. 6) may be provided that is configured to receive the sonar return data, and the processing circuitry 665 may be configured to generate one or more three-dimensional sonar images based on the sonar return data. Furthermore, a display 670 (see FIG. 6) may be provided that may present the one or more sonar images. Where three-dimensional reflective sonar imaging assemblies are used, sonar returns have a horizontal angle value (theta), a vertical angle value (phi), and a range value (r), and the receivers 434A of the three-dimensional array 434 may be configured to detect the horizontal angle, vertical angle, and range values for sonar returns. The calculation of the range value may be time-based.

Looking now at FIG. 4C, a reflective wall 428 is illustrated in isolation. The reflective surface 430 is provided in the internal portion of the reflective wall 428, and the reflective surface 430 defines a concave shape along the X-axis and along the Y-axis. In some embodiments, the reflective surface 430 may possess a partially spherical shape with a radial curvature.

Figure 5A:
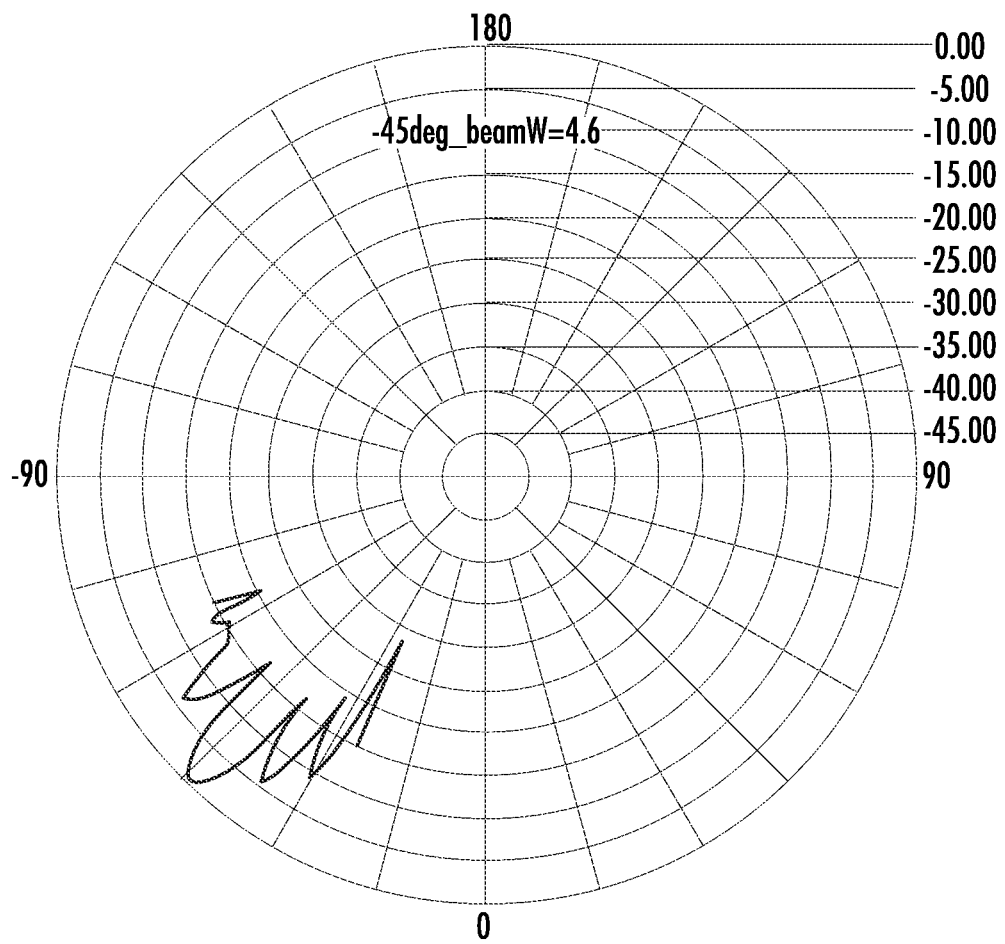
Figure 5B:
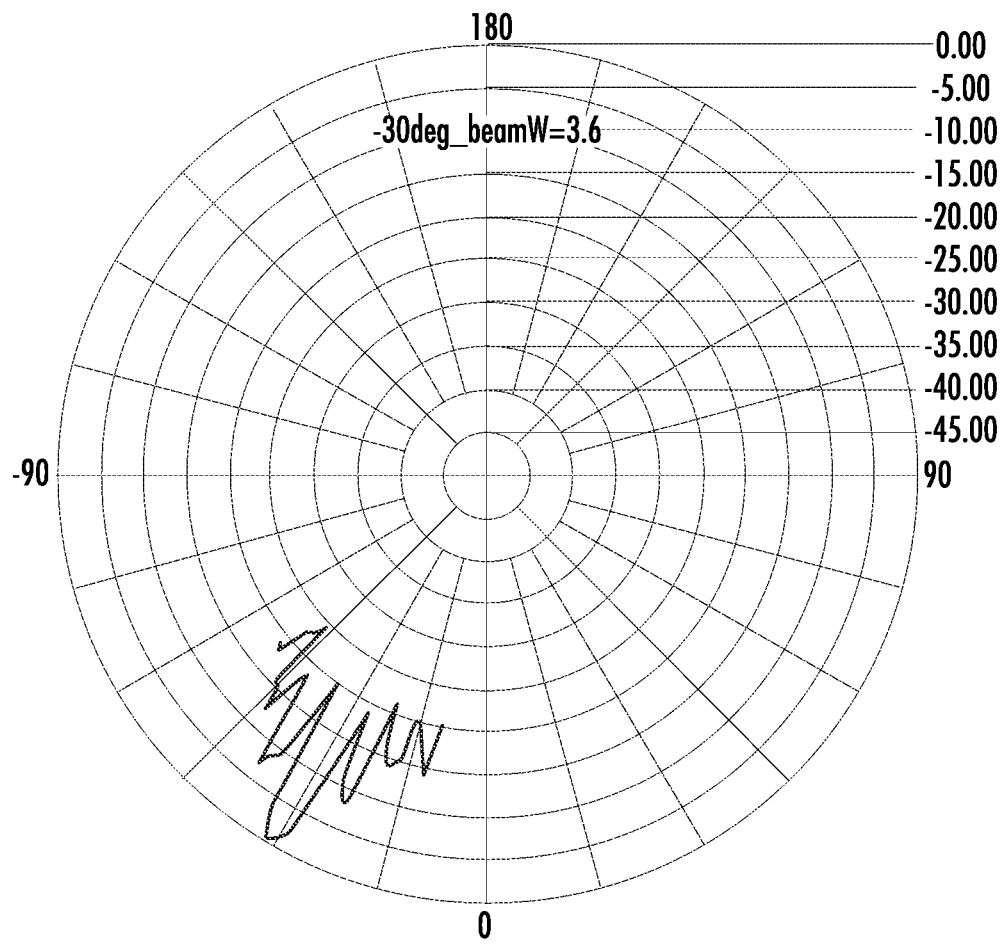
Figure 5C:
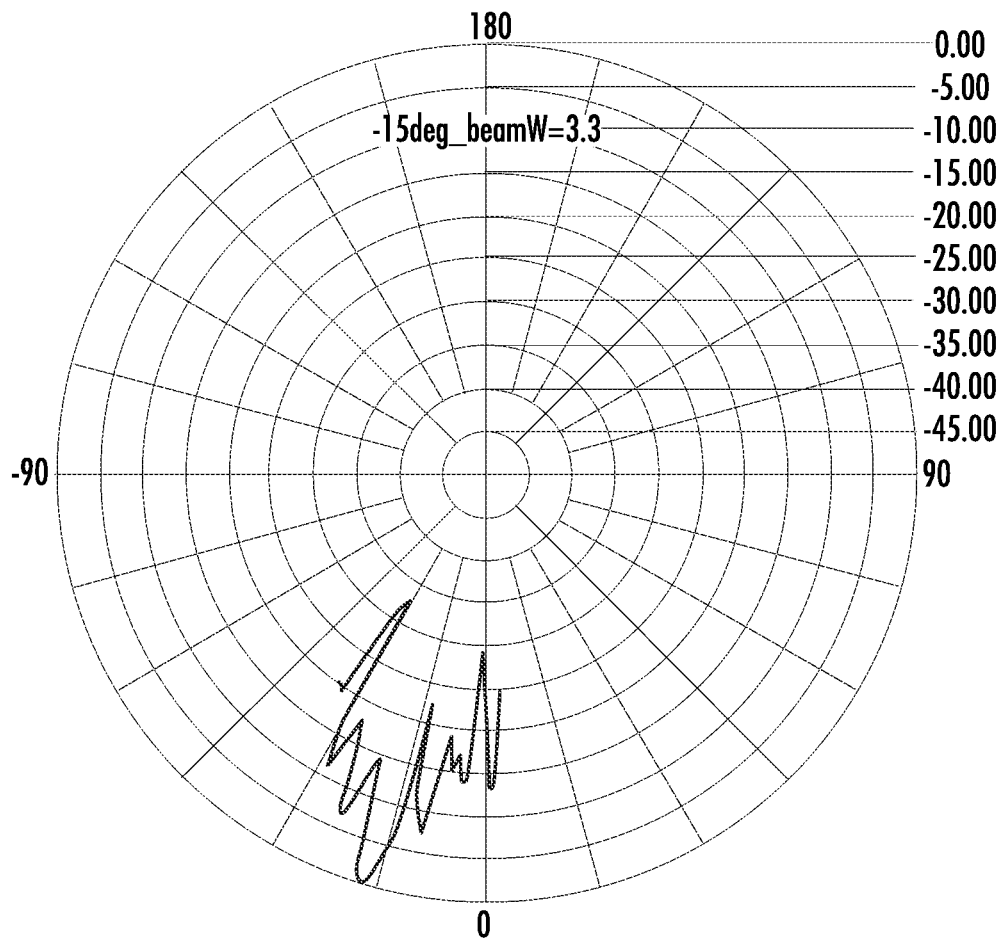
Figure 5D:
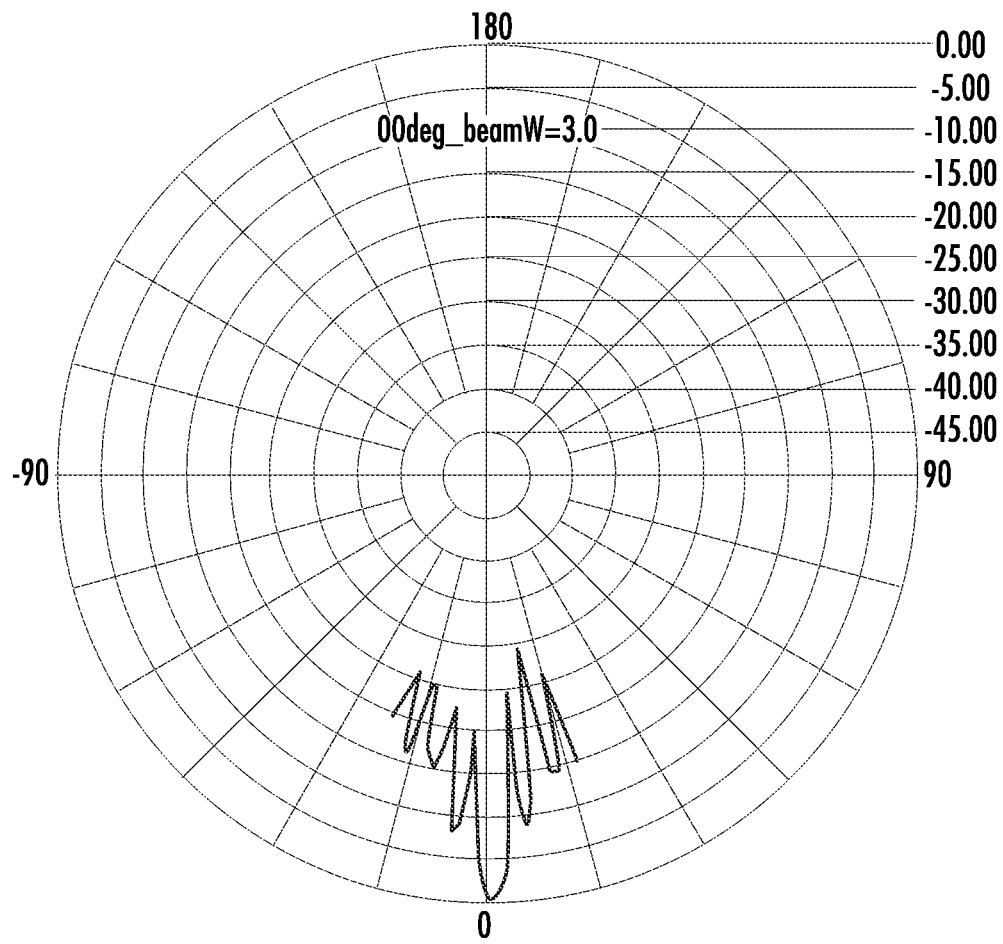
Figure 5E:
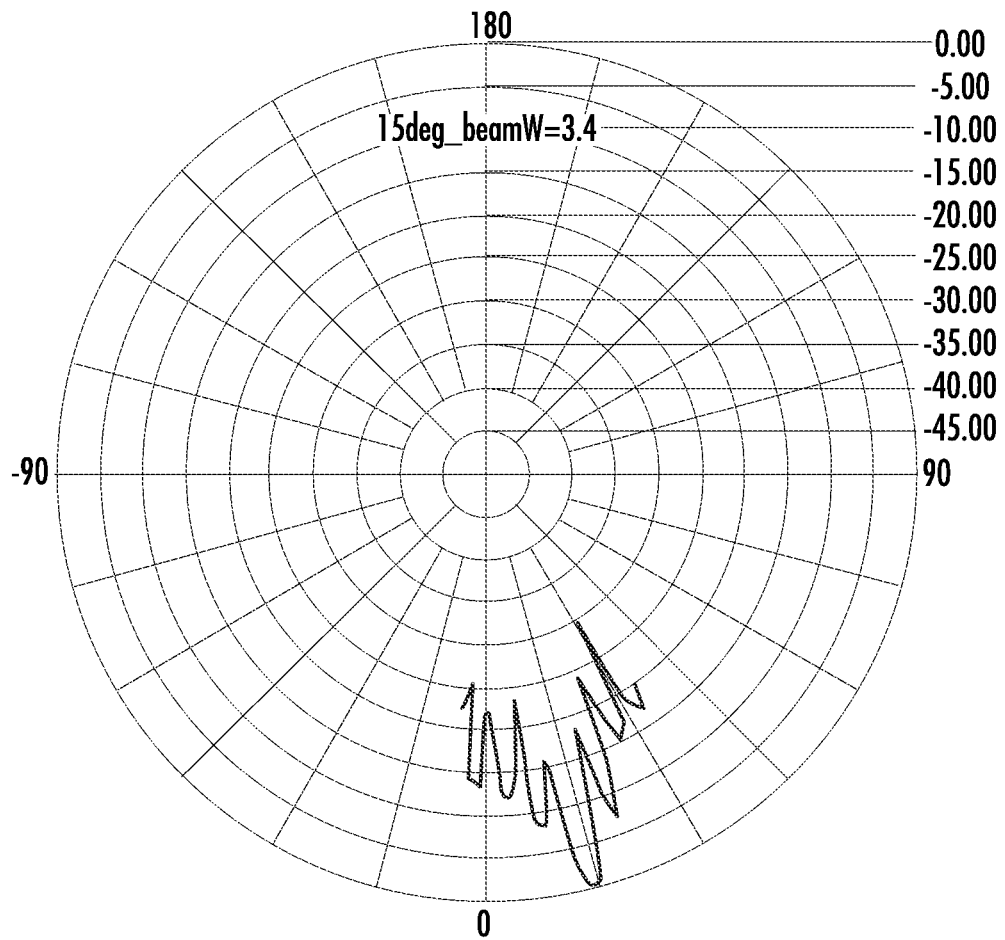
Figure 5F:
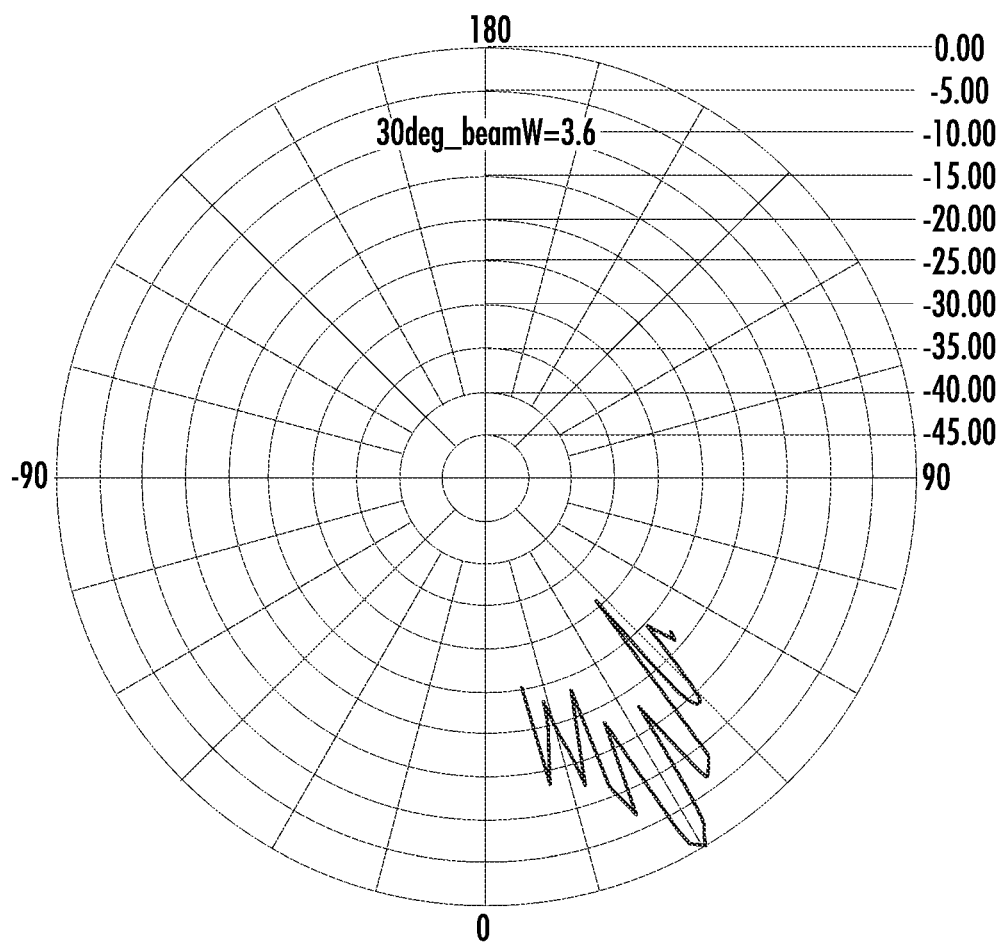
Figure 5G:
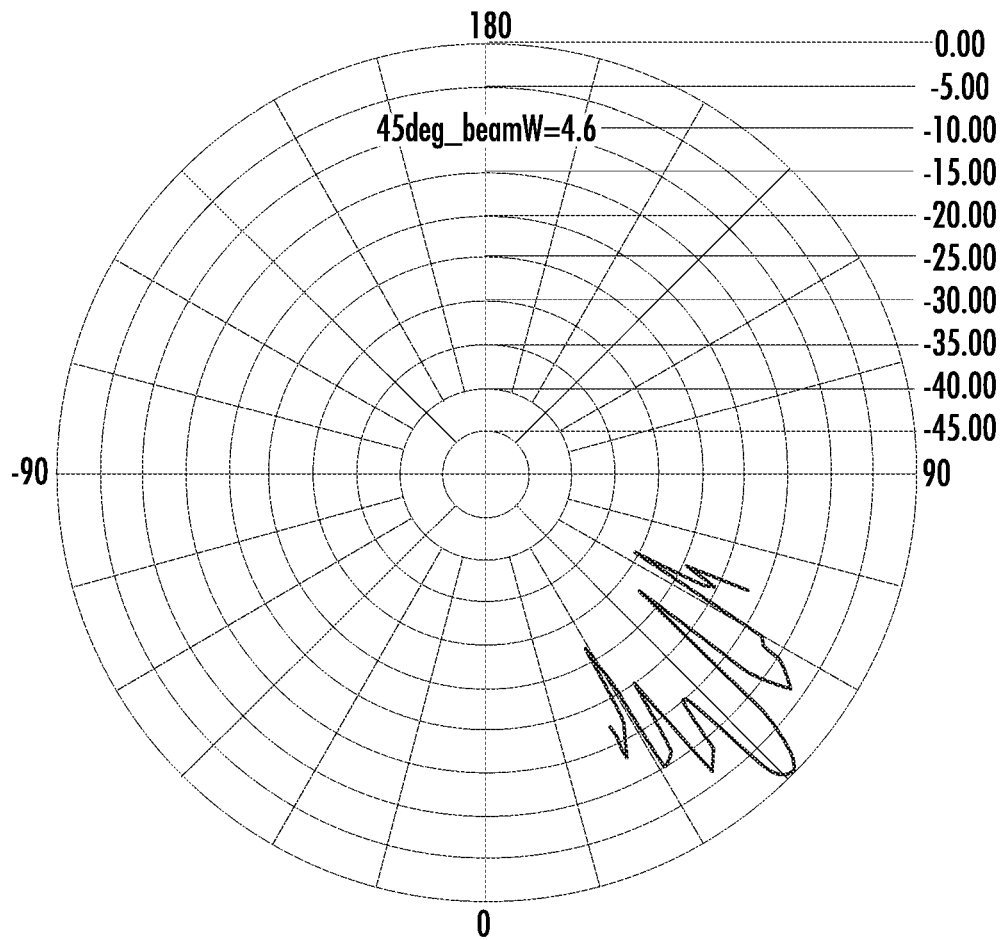

When sonar returns are received at receivers, the sonar returns may form sonar return patterns. FIGS. 5A-5G illustrate various plots illustrating sonar return patterns for sonar returns from receivers positioned at various locations. The receivers may be placed around a receiver arc in a reflective sonar imaging assembly. FIG. 5A illustrates a first sonar return pattern where a receiver is placed −45 degrees from the central position, and the first sonar return pattern has a central lobe centered at approximately the −45 degree position on the plot illustrated in FIG. 5A. FIG. 5B illustrates a second sonar return pattern where a receiver is placed −30 degrees from the central position, and the second sonar return pattern has a central lobe centered at approximately the −30 degree position on the plot illustrated in FIG. 5B. FIG. 5C illustrates a third sonar return pattern where a receiver is placed −15 degrees from the central position, and the third sonar return pattern has a central lobe centered at approximately the −15 degree position on the plot illustrated in FIG. 5C. FIG. 5D illustrates a fourth sonar return pattern where a receiver is placed at a central position, and the fourth sonar return pattern has a central lobe centered at approximately the 0 degree position on the plot illustrated in FIG. 5D. FIG. 5E illustrates a fifth sonar return pattern where a receiver is placed 15 degrees from the central position, and the fifth sonar return pattern has a central lobe centered at approximately the 15 degree position on the plot illustrated in FIG. 5E. FIG. 5F illustrates a sixth sonar return pattern where a receiver is placed 30 degrees from the central position, and the sixth sonar return pattern has a central lobe centered at approximately the 30 degree position on the plot illustrated in FIG. 5F. FIG. 5G illustrates a seventh sonar return pattern where a receiver is placed 45 degrees from the central position, and the seventh sonar return pattern has a central lobe centered at approximately the 45 degree position on the plot illustrated in FIG. 5G. Each of the plots illustrated in FIGS. 5A-5G have central lobes where the sonar return pattern has the highest intensity, but additional side lobes may also be included. Thus, receivers may receive sonar returns at multiple angles even when remaining stationary. For example, in the first sonar return pattern of FIG. 5A, side lobes may be present that are centered at angles that are −52.5 degrees, −37.5 degrees, and −30 degrees from the forward facing direction. However, side lobes may be present at other approach angles, and side lobes may be spaced differently in other embodiments. By using receivers located at different positions or by shifting a receiver, an alternative to conventional beamforming may be accomplished.

In some embodiments, sonar return data may be filtered before any sonar image is created. For example, sonar return data may be filtered so that only sonar returns having a magnitude greater than a threshold level are included in sonar images, and this may improve the signal-to-noise ratio for sonar returns and may also improve the image quality and resolution of sonar images. In one embodiment, sonar return data may be filtered so that only sonar returns having a magnitude greater (e.g., less negative) than −5 decibels are included, and this may cause only sonar returns in the central lobes to be included. However, in other embodiments, the threshold level may be set at −12.5 or some other number so that sonar returns from side lobes may also be included.

Various electrical components may be provided in reflective sonar imaging systems. FIG. 6 illustrates a block diagram with electrical components that may be provided in a reflective sonar imaging system. A reflective sonar imaging assembly 602 is provided, and this reflective sonar imaging assembly 602 includes an actuator 680 and one or more receivers. The actuator 680 may be configured to cause receiver(s) to shift along a receiver arc. Example actuators 680 may include a motor such as a servomotor, a pneumatic or hydraulic cylinder, etc. In the illustrated embodiment, three or more receivers are shown, with a first receiver 634A, a second receiver 634B, and a final receiver 634N being shown. A transmitter 635 is also provided, and this transmitter 635 may be connected to the processor 664 as illustrated. The transmitter 635 is provided away from the reflective sonar imaging assembly 602 at another location on the watercraft 126 (see FIG. 1). However, the transmitter

635 may be provided as part of the reflective sonar imaging assembly 602 in some embodiments. In some embodiments, the transmitters 635 may be configured to transmit a plurality of sonar beams into a body of water 101 at different transmission angles. Transmitter(s) 635 may be used alongside the reflective sonar imaging assembly 602 to form forward scan sonar images, down scan sonar images, side scan sonar images, or other sonar images. The transmitter(s) 635 may be used to form various types of sonar beams. For example, the transmitter(s) may be configured to form frequency steered sonar beams, broadband sonar beams, split sonar beams, wide beams, focused beams, etc.

A marine electronic device 660 is also provided having a user interface 668 and a display 670. The display 670 may present the one or more sonar images. Furthermore, the marine electronic device 660 includes processing circuitry 665 including a processor 664 and memory 666. The processing circuitry 665 may be configured to receive sonar return data, and the processing circuitry 665 may be configured to generate one or more sonar images based on the sonar return data. The marine electronic device 660 also includes sensors 674 located in the marine electronic device 660, but the marine electronic device 660 may also be connected to other onboard sensors 682 and an onboard position sensor 684 through a wired or wireless connection.

The marine electronic device 660 also includes a communication interface 672, and this communication interface 672 may be configured to form a connection with an external network 676 so that information may be received from a remote server 678 via the external network 676.

Methods for generating sonar images are also contemplated using the sonar imaging assembly. FIG. 7 illustrates a flow chart showing a method 700 for generating sonar images. At operation 702, a reflective sonar imaging assembly is provided. The reflective sonar imaging assembly has a reflective surface defining a concave shape, a receiving aperture, and a receiver positioned between the reflective surface and the receiving aperture. At operation 704, processing circuitry and a display are provided. At operation 706, a plurality of sonar returns are received through the receiving aperture. At operation 708, the plurality of sonar returns are reflected off of the reflective surface towards the receiver to form reflected sonar returns. At operation 710, the reflected sonar returns are received at the receiver. At operation 712, sonar return data is generated based on the reflected sonar returns. At operation 714, the sonar return data is shared with processing circuitry. At operation 716, the sonar return data is used to form a sonar image. At operation 718, the sonar image is presented on a display.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A reflective sonar imaging system, the reflective sonar imaging system comprising:
   a reflective sonar imaging assembly including:
      a reflective surface defining a concave shape;
      a receiving aperture; and
      a receiver positioned between the reflective surface and the receiving aperture;
   a display; and
   processing circuitry,
   wherein the reflective surface is configured to cause sonar returns to be reflected as reflected sonar returns toward the receiver, wherein the sonar returns enter the reflective sonar imaging assembly through the receiving aperture, wherein the receiver is configured to receive the reflected sonar returns, wherein the receiver is configured to generate sonar return data using the reflected sonar returns that are received, wherein the processing circuitry is configured to receive the sonar return data and generate one or more sonar images based on the sonar return data, wherein the display is configured to present the one or more sonar images.

2. The reflective sonar imaging system of claim 1, wherein the receiver is configured to shift to various positions along a first arc, wherein the first arc is radially curved.

3. The reflective sonar imaging system of claim 2, wherein the receiver is configured to be manually shifted to various positions along the first arc.

4. The reflective sonar imaging system of claim 2, wherein the receiver is configured to be shifted to various positions along the first arc automatically.

5. The reflective sonar imaging system of claim 1, wherein a plurality of receivers are positioned between the reflective surface and the receiving aperture, wherein the plurality of receivers are stationary and are positioned along a first arc, wherein the first arc is radially curved.

6. The reflective sonar imaging system of claim 1, wherein a plurality of receivers are positioned between the reflective surface and the receiving aperture, wherein the plurality of receivers are positioned along a first arc, wherein the plurality of receivers are configured to shift to various positions along the first arc, wherein the first arc is radially curved.

7. The reflective sonar imaging system of claim 1, wherein the reflective sonar imaging system is configured to generate a two-dimensional sonar image, wherein a plurality of receivers are positioned along a first arc that is between the reflective surface and the receiving aperture, wherein the plurality of receivers are either stationary or are configured to shift along the first arc.

8. The reflective sonar imaging system of claim 1, further comprising:
   a three-dimensional array of receivers,
   wherein the reflective sonar imaging system is configured to generate a three-dimensional sonar image, wherein the reflective surface defines a first axis and a second axis, wherein the second axis is perpendicular to the first axis, wherein the reflective surface has a concave shape along both the first axis and the second axis.

9. The reflective sonar imaging system of claim 1, wherein the receiver is configured to shift to various positions along a first arc, wherein the first arc has a first radius, wherein the reflective surface defines a second arc having a second radius that is greater than the first radius, wherein the first arc and the second arc share a same center point.

10. The reflective sonar imaging system of claim 9, wherein the second radius is 1.954 times greater than the first radius.

11. The reflective sonar imaging system of claim 10, wherein the first radius is 25.591 millimeters, wherein the second radius is 50.000 millimeters.

12. The reflective sonar imaging system of claim 1, wherein the reflective sonar imaging system is configured to generate sonar images for a field of view that is greater than ninety degrees.

13. The reflective sonar imaging system of claim 1, wherein the receiver is a single point receiver.

14. The reflective sonar imaging system of claim 1, wherein the reflective surface extends about a circular arc, wherein the circular arc extends at least 115 degrees.

15. The reflective sonar imaging system of claim 1, wherein the reflective sonar imaging assembly includes aluminum, silver, gold, magnesium fluoride, calcium fluoride, high air content finely celled rubber foam material, other metals, or metal oxides at the reflective surface.

16. The reflective sonar imaging system of claim 1, wherein the processing circuitry is configured to filter sonar returns having lower intensities.

17. A reflective sonar imaging assembly, the reflective sonar imaging assembly comprising:
 a reflective surface defining a concave shape;
 a receiving aperture; and
 a receiver positioned between the reflective surface and the receiving aperture,
 wherein the reflective surface is configured to cause sonar returns to be reflected as reflected sonar returns towards the receiver, wherein the sonar returns enter the reflective sonar imaging assembly through the receiving aperture, wherein the receiver is configured to receive the reflected sonar returns, wherein the receiver is configured to generate sonar return data using the reflected sonar returns that are received.

18. The reflective sonar imaging assembly of claim 17, wherein the receiver is configured to shift to various positions along a first arc, wherein the first arc has a first radius, wherein the reflective surface defines a second arc having a second radius that is greater than the first radius, wherein the first arc and the second arc share a same center point.

19. The reflective sonar imaging assembly of claim 17, wherein a plurality of receivers are positioned between the reflective surface and the receiving aperture, wherein the plurality of receivers are positioned along a first arc, wherein the first arc has a first radius, wherein the reflective surface defines a second arc having a second radius that is greater than the first radius, wherein the first arc and the second arc share a same center point.

20. A method for generating sonar images, the method comprising:
 providing a reflective sonar imaging assembly including:
  a reflective surface defining a concave shape;
  a receiving aperture; and
  a receiver positioned between the reflective surface and the receiving aperture, wherein the reflective surface is configured to cause sonar returns to be reflected as reflected sonar returns towards the receiver, wherein the sonar returns enter the reflective sonar imaging assembly through the receiving aperture, wherein the receiver is configured to receive the reflected sonar returns;
 providing processing circuitry;
 providing a display;
 receiving the reflected sonar returns at the receiver and generating sonar return data based on the reflected sonar returns;
 generating one or more sonar images based on the sonar return data; and
 causing presentation of the one or more sonar images on the display.

* * * * *